United States Patent
Takeda et al.

(10) Patent No.: US 11,792,812 B2
(45) Date of Patent: Oct. 17, 2023

(54) SEARCH SPACE CONFIGURATIONS FOR MULTI-COMPONENT CARRIER SCHEDULING

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Xiaoxia Zhang, San Diego, CA (US); Huilin Xu, Temecula, CA (US); Mostafa Khoshnevisan, San Diego, CA (US); Tao Luo, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/220,173

(22) Filed: Apr. 1, 2021

(65) Prior Publication Data
US 2021/0314993 A1 Oct. 7, 2021

Related U.S. Application Data

(60) Provisional application No. 63/004,366, filed on Apr. 2, 2020.

(51) Int. Cl.
*H04W 72/23* (2023.01)
*H04L 5/00* (2006.01)

(52) U.S. Cl.
CPC ............ *H04W 72/23* (2023.01); *H04L 5/001* (2013.01)

(58) Field of Classification Search
CPC ............................ H04L 5/001; H04W 72/1289
(Continued)

(56) References Cited

U.S. PATENT DOCUMENTS 8,989,026 B2 3/2015 Gaal et al.
10,462,800 B2 * 10/2019 Lee ..................... H04W 24/10
(Continued)

FOREIGN PATENT DOCUMENTS

CN 102415038 B 9/2014
CN 110166203 A 8/2019
(Continued)

OTHER PUBLICATIONS

International Search Report and Written Opinion—PCT/US2021/025546—ISA/EPO—dated Jul. 16, 2021.
(Continued)

*Primary Examiner* — Peter G Solinsky
(74) *Attorney, Agent, or Firm* — Holland & Hart LLP

(57) ABSTRACT

Methods, systems, and devices for wireless communications are described. A user equipment (UE) may establish a connection, with base station, over a first and second component carrier and may monitor a search space configured for scheduling multiple component carriers. In some cases, the UE may be configured to monitor a search space allocated for a virtual component carrier associated with scheduling multiple component carriers, or the UE may be configured to monitor for a subset of physical downlink control channel (PDCCH) candidates in search spaces associated with the first and second component carriers, where the subset of PDCCH candidates may be allocated for multi-component carrier scheduling. The UE may receive downlink control information (DCI) that schedules a set of data transmissions over the first and second component carriers and the UE may perform or receive the set of data transmissions over the first and second component carrier.

30 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 11,476,973 B2* | 10/2022 | Zhang | H04W 72/042 |
| 2012/0300752 A1* | 11/2012 | Kwon | H04W 74/0833 |
| | | | 370/336 |
| 2013/0272259 A1* | 10/2013 | Kim | H04J 11/005 |
| | | | 370/329 |
| 2013/0286992 A1* | 10/2013 | Hong | H04L 5/0094 |
| | | | 370/329 |
| 2013/0329686 A1 | 12/2013 | Kim et al. | |
| 2014/0126506 A1* | 5/2014 | Horiuchi | H04W 72/1273 |
| | | | 370/329 |
| 2018/0115965 A1 | 4/2018 | Takeda et al. | |
| 2021/0136770 A1* | 5/2021 | Nakashima | H04W 72/0453 |

FOREIGN PATENT DOCUMENTS

| | | |
|---|---|---|
| JP | 2013539303 A | 10/2013 |
| WO | WO-2011116183 A1 | 9/2011 |
| WO | WO-2019049560 A1 | 3/2019 |
| WO | WO-2020029945 A1 | 2/2020 |

OTHER PUBLICATIONS

Nokia, et al., "Dormancy," 3GPP Draft, 3GPP TSG-RAN WG2 Meeting #107bis, R2-1912992, Dormancy in RAN2, 3rd Generation Partnership Project (3GPP), Mobile Competence Centre, 650, Route Des Lucioles, F-06921, Sophia-Antipolis Cedex, France, vol. RAN WG2. No. Chongqing, China; Oct. 14, 2019-Oct. 18, 2019, Oct. 4, 2019 (Oct. 4, 2019), XP051804778, 4 pages, Retrieved from the Internet: URL: https://ftp.3gpp.org/tsg_ran/WG2_RL2/TSGR2_107bis/Docs/R2-1912992.zip R2-1912992 Dormancy in RAN2. docx [retrieved on Oct. 4, 2019] section 2 section 3.

NTT DOCOMO: "Offline Summary for PDCCH Structure and Search Space", 3GPP Draft, 3GPP TSG RAN WG1 Meeting #94, R1-1809855, Summary Al 7.1.3.1 R7, 3rd Generation Partnership Project-(3GPP). Mobile Competence Centre ; 658. Route Des Lucioles ; F-86921 Sophia-Antipolis Cedex ; France, vol. RAN WG1. No. Gothenburg, Sweden, Aug. 20, 2018-Aug. 24, 2018, Aug. 23, 2018 (Aug. 23, 2018), XP051517212, 70 Pages, Retrieved from the Internet: URL: http://www.3gpp.org/ftp/tsg%5Fran/WG1%5FRL1/TSGR1%5F94/Docs/R1%2D1809855%2Ezip. [Retrieved on Aug. 23, 2018] p. 6. line 2-line 4.

* cited by examiner

SEARCH SPACE CONFIGURATIONS FOR MULTI-COMPONENT CARRIER SCHEDULING

CROSS REFERENCE

The present Application for Patent claims the benefit of U.S. Provisional Patent Application No. 63/004,366 by TAKEDA et al., entitled "SEARCH SPACE CONFIGURATIONS FOR MULTI-COMPONENT CARRIER SCHEDULING," filed Apr. 2, 2020, assigned to the assignee hereof, and expressly incorporated by reference herein.

FIELD OF TECHNOLOGY

The following relates generally to wireless communications and more specifically to search space configurations for multi-component carrier scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support search space configurations for multi-component carrier scheduling.

Generally, the described techniques provide for improving multi-component carrier scheduling procedures. A user equipment (UE) may establish a connection, with a base station, over at least a first component carrier and a second component carrier. The first component carrier may correspond to a primary cell (PCell) and the second component carrier may correspond to a secondary cell (SCell), or vice versa. In some cases, the PCell may support dynamic spectrum sharing (DSS) and the SCell may not support DSS. Additionally or alternatively, the first component carrier and the second component carrier may both support DSS, or neither may support DSS. The UE may be configured to monitor a search space configured for scheduling multiple component carriers, such as the first component carrier and the second component carrier. In some cases, the UE may be configured to monitor a search space allocated for a virtual component carrier associated with scheduling multiple component carriers. The search space for the virtual component carrier may be separate from a search space allocated for the first component carrier and a search space allocated for the second component carrier.

In some cases, rather than configuring a virtual component carrier via a separate search space, the UE may be configured to monitor a portion of a first search space of the first component carrier or monitor a portion of a second search space of the second component carrier, or a combination thereof. The portion of the first search space of the first component carrier and the portion of the second search space of the second component carrier may include specific physical downlink control channel (PDCCH) candidates within each search space that are associated with simultaneously scheduling the first component carrier and the second component carrier.

The UE may receive downlink control information (DCI) from a base station based on the monitoring, where the DCI may schedule a set of data transmissions over the first component carrier and the second component carrier. In some cases, the data transmission may be uplink data transmissions configured and transmitted by the UE, or may be downlink data transmissions transmitted by a base station to the UE, or both. If the received DCI schedules uplink data transmissions, the UE may perform and transmit the set of data transmissions over the first component carrier and the second component carrier based on the DCI. If the received DCI schedules downlink data transmissions, the UE may receive the set of data transmissions over the first component carrier and the second component carrier based on the DCI.

A method of wireless communications at a UE is described. The method may include establishing a connection, with a base station, over at least a first component carrier and a second component carrier, monitoring a search space configured for scheduling multiple component carriers, receiving DCI from the base station based on the monitoring, the DCI scheduling a set of data transmissions over the first component carrier and the second component carrier, and performing or receiving the set of data transmissions over the first component carrier and the second component carrier based on the DCI.

An apparatus for wireless communications at a UE is described. The apparatus may include a processor, a memory coupled with the processor, where the memory includes instructions. The instructions may be executable by the processor to cause the apparatus to establish a connection, with a base station, over at least a first component carrier and a second component carrier, monitor a search space configured for scheduling multiple component carriers, receive DCI from the base station based on the monitoring, the DCI scheduling a set of data transmissions over the first component carrier and the second component carrier, and perform or receiving the set of data transmissions over the first component carrier and the second component carrier based on the DCI.

Another apparatus for wireless communications at a UE is described. The apparatus may include means for establishing a connection, with a base station, over at least a first component carrier and a second component carrier, monitoring a search space configured for scheduling multiple component carriers, receiving DCI from the base station based on the monitoring, the DCI scheduling a set of data transmissions over the first component carrier and the second component carrier, and performing or receiving the set of data transmissions over the first component carrier and the second component carrier based on the DCI.

A non-transitory computer-readable medium storing code for wireless communications at a UE is described. The code may include instructions executable by a processor to establish a connection, with a base station, over at least a first component carrier and a second component carrier, monitor a search space configured for scheduling multiple component carriers, receive DCI from the base station based on the monitoring, the DCI scheduling a set of data transmissions over the first component carrier and the second component carrier, and perform or receiving the set of data transmissions over the first component carrier and the second component carrier based on the DCI.

Some examples of the method, apparatuses, and non-transitory computer-readable medium described herein may further include operations, features, means, or instructions for receiving configuration information for a virtual component carrier associated with scheduling multiple component carriers, the configuration information including an indication of a search space of the virtual component carrier, where the search space of the virtual component carrier includes the search space configured for scheduling multiple component carriers.

In some examples of the method, apparatuses, and non-transitory computer-readable medium described herein, the search space for the virtual component carrier may be separate from a search space for the first component carrier and a search space for the second component carrier.

In some examples of the method, apparatuses, and non-transitory computer-readable medium described herein, the configuration information includes a carrier indicator field (CIF) value assigned to the virtual component carrier.

Some examples of the method, apparatuses, and non-transitory computer-readable medium described herein may further include operations, features, means, or instructions for determining that the received DCI may be associated with scheduling the first component carrier and the second component carrier based on a presence of the CIF value assigned to the virtual component carrier in the received DCI.

Some examples of the method, apparatuses, and non-transitory computer-readable medium described herein may further include operations, features, means, or instructions for determining that the received DCI may be associated with scheduling the first component carrier and the second component carrier based on a PDCCH candidate on which the DCI may be received within the search space configured for scheduling multiple component carriers.

Some examples of the method, apparatuses, and non-transitory computer-readable medium described herein may further include operations, features, means, or instructions for determining that the received DCI may be associated with scheduling the first component carrier and the second component carrier based on the search space configured for scheduling multiple component carriers.

Some examples of the method, apparatuses, and non-transitory computer-readable medium described herein may further include operations, features, means, or instructions for transmitting, to the base station, a UE capability report including an indication of how many PDCCH candidates the UE may be capable of monitoring within the search space for the virtual component carrier.

In some examples of the method, apparatuses, and non-transitory computer-readable medium described herein, receiving the configuration information for the virtual component carrier may include operations, features, means, or instructions for receiving a search space configuration for the virtual component carrier based on the UE capability report, where monitoring the search space configured for scheduling multiple component carriers may be based on the search space configuration for the virtual component carrier.

In some examples of the method, apparatuses, and non-transitory computer-readable medium described herein, receiving the configuration information for the virtual component carrier may include operations, features, means, or instructions for receiving radio resource control (RRC) signaling including the configuration information for the virtual component carrier.

In some examples of the method, apparatuses, and non-transitory computer-readable medium described herein, monitoring the search space may include operations, features, means, or instructions for monitoring one or more of: a first portion of a first search space of the first component carrier or monitoring a second portion of a second search space of the second component carrier, or a combination thereof.

In some examples of the method, apparatuses, and non-transitory computer-readable medium described herein, the first portion of the first search space includes a first subset of a first set of PDCCH candidates in the first search space, and the second portion of the second search space includes a second subset of a second set of PDCCH candidates in the second search space.

Some examples of the method, apparatuses, and non-transitory computer-readable medium described herein may further include operations, features, means, or instructions for receiving RRC signaling identifying one or more of the first subset of the first set of PDCCH candidates or the second subset of the second set of PDCCH candidates as being associated with simultaneously scheduling the first component carrier and the second component carrier.

Some examples of the method, apparatuses, and non-transitory computer-readable medium described herein may further include operations, features, means, or instructions for identifying one or more of the first subset of the first set of physical downlink channel control candidates or the second subset of the second set of PDCCH candidates based on an order of PDCCH candidates within the first search space or the second search space.

Some examples of the method, apparatuses, and non-transitory computer-readable medium described herein may further include operations, features, means, or instructions for identifying one or more of the first subset of the first set of PDCCH candidates or the second subset of the second set of PDCCH candidates based on a DCI size difference between the first search space and the second search space.

In some examples of the method, apparatuses, and non-transitory computer-readable medium described herein, the search space configured for scheduling multiple component carriers may be in a non-DSS S cell.

DETAILED DESCRIPTION

Figure 1:
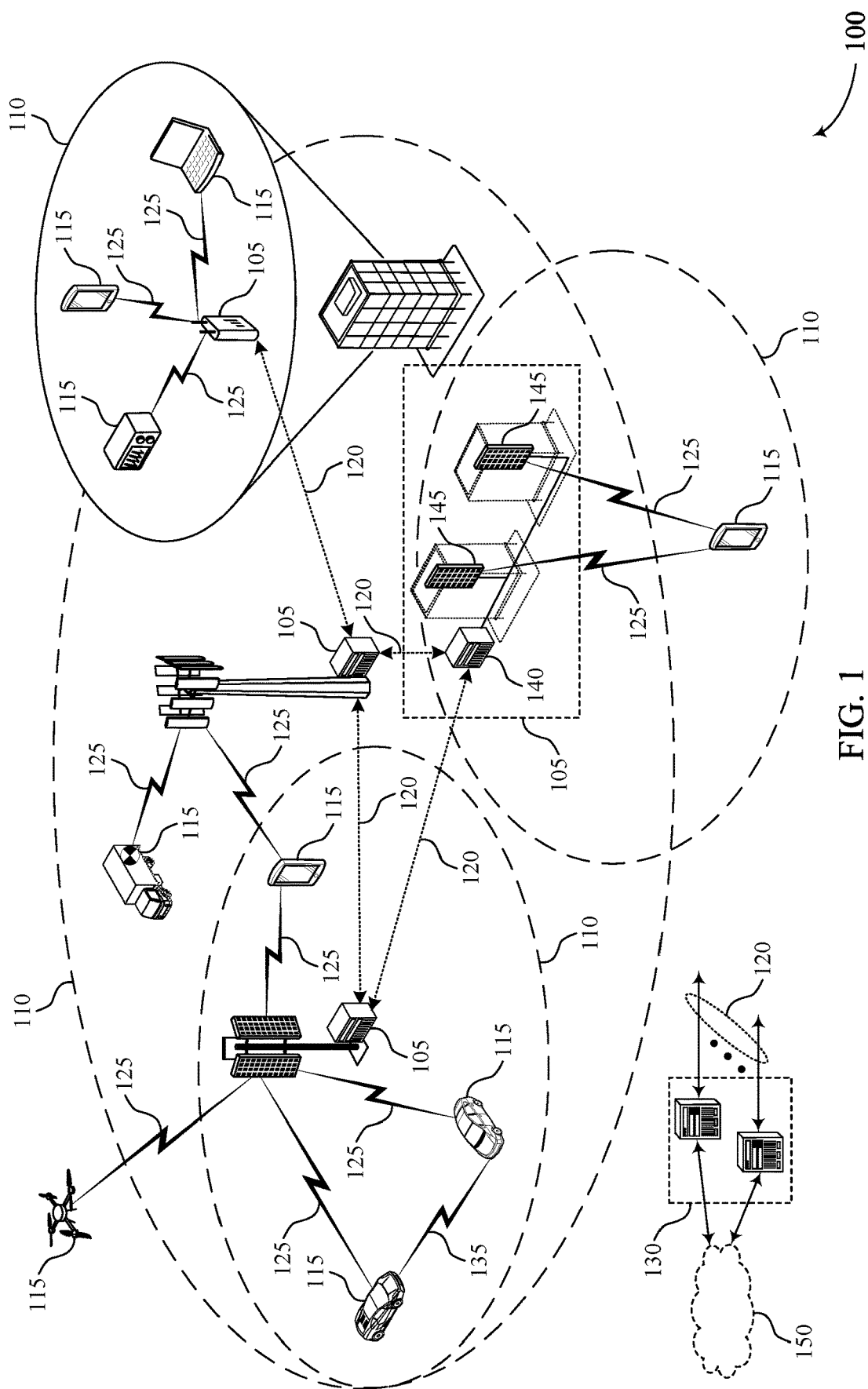
FIG. 1 illustrates an example of a system for wireless communications that supports search space configurations for multi-component carrier scheduling in accordance with aspects of the present disclosure.

In some wireless communications systems, a user equipment (UE) may establish a connection with a base station over at least a first component carrier and a second component carrier. In some wireless communications systems, the first component carrier may refer to a component carrier corresponding to a dynamic spectrum sharing (DSS) primary cell (PCell), and the second component carrier may refer to a non-DSS secondary cell (SCell). In some other cases, both the first component carrier and the second component carrier may support DSS, or neither of the component carriers may support DSS. The UE may be configured to monitor physical downlink control channel (PDCCH) candidates within a search space on the DSS PCell for downlink control information (DCI) transmitted from a base station that schedules data transmissions, such as physical uplink shared channel (PUSCH) transmissions, or physical downlink shared channel (PDSCH) transmissions, or any other transmissions, on one of the component carriers. To schedule data transmissions on multiple component carriers (e.g., multi-component carrier scheduling, joint-component carrier scheduling, cross-carrier scheduling), the UE may monitor for and receive multiple DCIs. Further, the PCell may serve low frequency bands (e.g., 2 GHz) and the SCell may serve medium to high frequency (HF) bands (e.g., 3.5 to 4.7 GHz). As such, the PCell may be used by a large number of devices (e.g., New Radio (NR) UEs, and Long-Term Evolution (LTE) UEs) and some of the devices (e.g., NR UEs) may not be able to achieve peak throughput. In some cases, the combination of lowered throughput and multiple DCIs needed for multi-component carrier scheduling may reduce reliability of the network.

To improve reliability and increase spectral efficiency, a component carrier may be configured with a single DCI format or PDCCH that may simultaneously schedule data transmissions on multiple component carriers, such as the SCell and PCell. In some cases, the DCI format or PDCCH may be configured on a non-DSS SCell. To support the DCI format on the SCell, a virtual component carrier may be configured that is a combination of the PCell and SCell. To monitor for DCI associated with the virtual component carrier, a search space may be configured on the SCell or the PCell, and the virtual component carrier search space may be separate from a search space associated with the PCell and a search space associated with the SCell. The UE may then monitor the search space for received DCI and upon receiving DCI, may receive or transmit (e.g., perform) data transmissions based on the DCI.

Additionally or alternatively, a subset of PDCCH candidates within a search space on the SCell allocated for scheduling the PCell, or PDCCH candidates within a search space on the SCell allocated for scheduling the SCell, or a combination thereof may be allocated for multi-component carrier scheduling. The UE may monitor one or more of the search spaces, and upon receiving DCI in a PDCCH from the subset of PDCCH candidates, the UE may determine the received DCI jointly schedules data transmissions on at least the PCell and the SCell. The UE may receive or transmit data transmissions based on the received DCI.

Particular aspects of the subject matter described herein may be implemented to realize one or more advantages. The described techniques may support improvements in multi-component carrier scheduling by decreasing signaling overhead, improving reliability, and increasing spectral efficiency among other advantages. As such, supported techniques may include improved network operations and, in some examples, may promote network efficiencies, among other benefits.

Aspects of the disclosure are initially described in the context of wireless communications systems. Aspects are then described with respect to examples of component carrier scheduling, search space configurations, and a process flow. Aspects of the disclosure are further illustrated by and described with reference to apparatus diagrams, system diagrams, and flowcharts that relate to search space configurations for multi-component carrier scheduling.

FIG. 1 illustrates an example of a wireless communications system 100 that supports search space configurations for multi-component carrier scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some wireless communications systems, a component carrier may be configured with a single DCI format or PDCCH that may simultaneously schedule data transmissions on multiple component carriers, such as an SCell and PCell. In some cases, the DCI format or PDCCH may be configured on a non-DSS SCell. To support a DCI format on the SCell that may schedule multiple component carriers, a UE 115 may be configured with search space resources for multi-component carrier scheduling. In some implementations, a virtual component carrier may be configured that is a combination of the SCell and the PCell. To monitor for DCI associated with the virtual component carrier a search space may be configured on the SCell. The UE 115 may then monitor the search space for received DCI and upon receiving DCI may receive or transmit data transmissions based on the DCI. Additionally or alternatively, a subset of PDCCH candidates within a search space on the SCell allocated for scheduling the PCell, or PDCCH candidates within a search space on the SCell allocated for scheduling the SCell, or a combination thereof may be allocated for multi-component carrier scheduling. The UE 115 may monitor one or more of the search spaces, and upon receiving DCI in a PDCCH from the subset of PDCCH candidates, the UE 115 may determine the received DCI jointly schedules data transmissions on at least the PCell and the SCell. The UE 115 may receive or transmit data transmissions based on the received DCI.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the HF or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Figure 2:
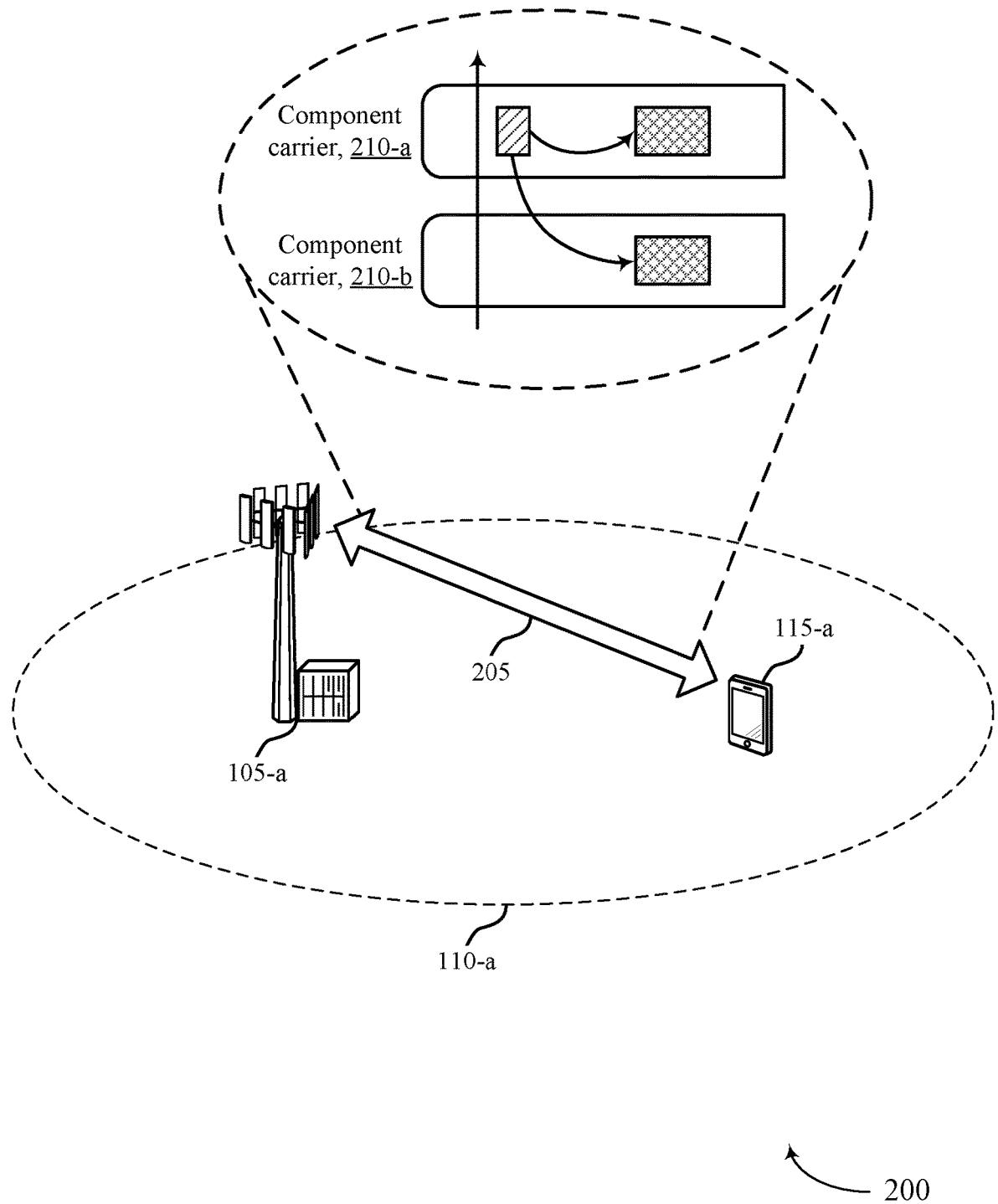
FIG. 2 illustrates an example of a system for wireless communications that supports search space configurations for multi-component carrier scheduling in accordance with aspects of the present disclosure.

FIG. 2 illustrates an example of a wireless communications system 200 that supports search space configurations for multi-component carrier scheduling in accordance with aspects of the present disclosure. The wireless communications system 200 may include base station 105-a and a UE 115-a, which may be examples of a base station 105 and a UE 115 as described with reference to FIG. 1. Base station 105-a may serve a geographic coverage area 110-a. In some cases, base station 105-a may implement a multi-component carrier scheduling procedure with UE 115-a. Additionally or alternatively, other wireless devices, such as UE 115-a, may implement the multi-component carrier scheduling procedure.

UE 115-a may establish a connection with base station 105-a over at least a first component carrier and a second component carrier such as component carriers 210-a and 210-b via communication link 205, where communication link 205 may support downlink and uplink transmissions. In some cases, component carrier 210-b may correspond to a DSS PCell and component carrier 210-a may correspond to a non-DSS SCell. In some other cases, both component carrier 210-a and component carrier 210-b may support DSS, or neither of the component carriers 210 may support DSS. In some cases, component carrier 210-b may support lower frequency bands (e.g., 2 GHz) and component carrier 210-a may support medium to HF bands (e.g., 3.5 GHz, 4.7 GHz). As such, the DSS PCell that supports lower frequency bands (e.g., component carrier 210-b) may serve multiple types of devices (e.g., LTE UEs, NR UEs) which may impact the ability of some devices to achieve peak throughput because the resources of the component carrier are being shared across the multiple types of devices and each type of device may not be able to utilize the full set of resources in the given spectrum. To support network improvements such as improved reliability and increased spectral efficiency, base station 105-a and UE 115-a may be configured to support data transmission scheduling information placed on the non-DSS SCell that supports higher frequencies (e.g., component carrier 210-a) because component carrier 210-a may serve a single type of device (e.g., 5G NR) and the full spectrum supported by component carrier 210-a may be used by each device on component carrier 210-a.

To further improve network reliability and increase spectral efficiency, a single data scheduling indication (e.g., PDCCH, DCI format, DCI) may be used to schedule multiple component carriers (e.g., multiple cells), such as component carriers 210-a and 210-b, rather than multiple scheduling indications being used to schedule the multiple component carriers. In an example, a physical control channel 215 (e.g., PDCCH) on component carrier 210-a may schedule a physical shared channel 220 (e.g., PDSCH, PUSCH) on component carriers 210-a and 210-b using a single DCI. In another example, a physical control channel 215 (e.g., PDCCH) on component carrier 210-b may schedule a physical shared channel 220 (e.g., PDSCH, PUSCH) on component carriers 210-a and 210-b using a single DCI.

In some cases, UE 115-a may be configured to monitor PDCCH candidates with a separate search space configured for joint-component carrier scheduling, or an existing search space may include a subset of PDCCH candidates allocated for multi-component carrier scheduling, or a combination thereof. For example, a virtual component carrier may be configured that is a combination of component carrier 210-a and component carrier 210-b. As such a search space may be configured that is associated with the virtual component carrier, where the search space is a separate search space than the search spaces associated with individual component carriers 210-a and 210-b. Upon receiving a DCI within the search space associated with the virtual component carrier, UE 115-a may determine the DCI includes scheduling information for at least component carrier 210-a and 210-b. In another example, rather than configuring a virtual component carrier and a separate search space, a subset of PDCCH candidates with a search space associated with component carrier 210-a or a search space associated with component carrier 210-b, or a combination thereof may be configured for joint-component carrier scheduling. Upon receiving a DCI in a PDCCH that is in the subset of PDCCH candidates associated with joint-component carrier scheduling, UE 115-a may determine the DCI includes scheduling information for at least component carrier 210-a and component carrier 2110-b.

Figure 3A:
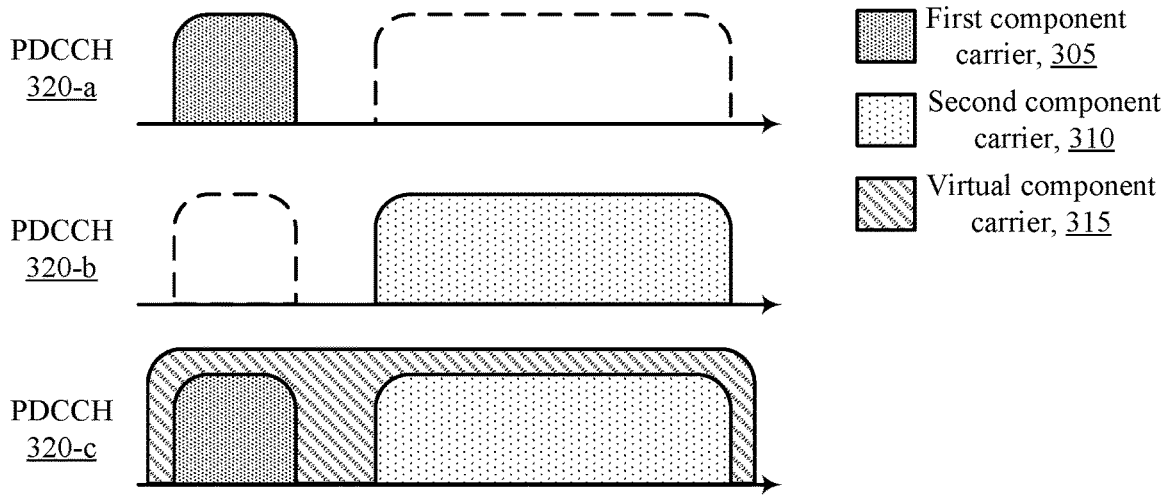
FIG. 3A illustrates an example of component carrier scheduling that supports search space configurations for multi-component carrier scheduling in accordance with aspects of the present disclosure.

FIG. 3A illustrates an example of component carrier scheduling 300 that supports search space configurations for multi-component carrier scheduling in accordance with aspects of the present disclosure. The component carrier scheduling 300 may include single component carrier scheduling or multi-component carrier scheduling. The component carrier scheduling may be implemented by a base station or a UE, which may be examples of a base station and UE as described with reference to FIGS. 1 and 2. In some cases, a base station may implement a multi-component carrier scheduling procedure with a UE. Additionally or alternatively, other wireless devices, such as a UE, may implement the multi-component carrier scheduling procedure.

A UE may be connected with a base station over at least a first component carrier 305 and a second component carrier 310. In some cases, the first component carrier 305 corresponds to a DSS PCell, and second component carrier 310 corresponds to a non-DSS SCell. The base station may transmit scheduling information (e.g., PDCCH, DCI, DCI formats) to the UE over one or more of the component carriers to schedule data transmissions over one or more of the component carriers. For example, a UE may receive PDCCH 320-a over the first component carrier 305 or the second component carrier 310 that schedules one or more data transmissions (e.g., PUSCHs, PDSCHs) on the first component carrier 305. In another example, a UE may receive PDCCH 320-b over the first component carrier 305 or the second component carrier 310 that schedules one or more data transmissions (e.g., PUSCHs, PDSCHs) on the second component carrier 310.

In some cases, the base station may jointly schedule the first component carrier 305 and the second component carrier 310. In some implementations, multi-component carrier scheduling may be processed by a UE as if the multi-component carrier scheduling were a virtual component carrier 315 that includes the first component carrier 305 and the second component carrier 310. The behavior of the UE for processing the virtual component carrier may be similar to the behavior of the UE for cross-carrier scheduling from one component carrier to three component carriers. In some cases, one or more DCIs that schedule multiple component carriers (e.g., a single DCI that schedules the virtual component carrier that includes the first component carrier 305 and the second component carrier 310) may be processed similarly to one or more DCIs that schedule a third component carrier. As such, the UE may individually process component carrier 305, component carrier 310, and virtual component carrier 315. For example, a UE may receive PDCCH 320-c over the first component carrier 305 or the second component carrier 310, in a search space configured for the virtual component carrier 315 that schedules one or more data transmissions (e.g., PUSCHs, PDSCHs) on the virtual component carrier 315. Because the virtual component carrier 315 is a combination of the first component carrier 305 and the second component carrier 310, PDCCH 320-c may schedule one or more data transmissions jointly on the first component carrier 305 and the second component carrier 310.

Figure 3B:
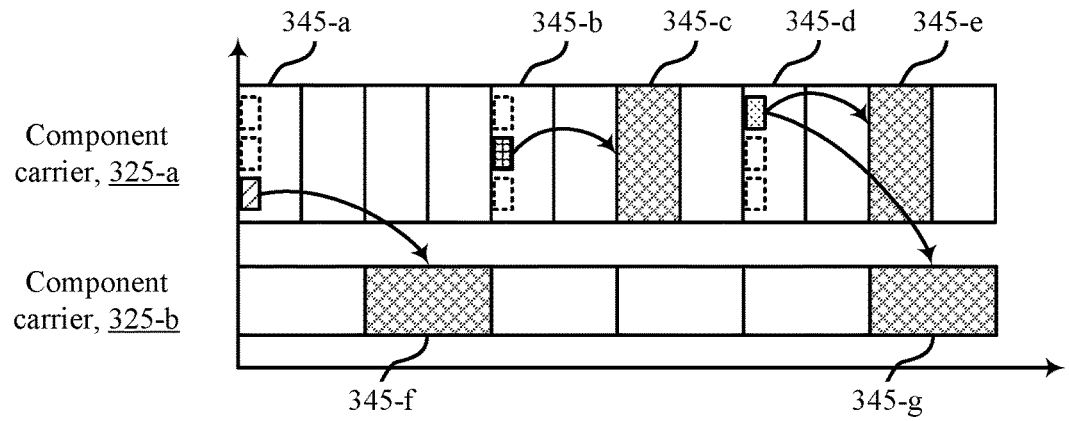
FIG. 3B illustrates an example of search space configurations that support search space configurations for multi-component carrier scheduling in accordance with aspects of the present disclosure.
Figure 3B:
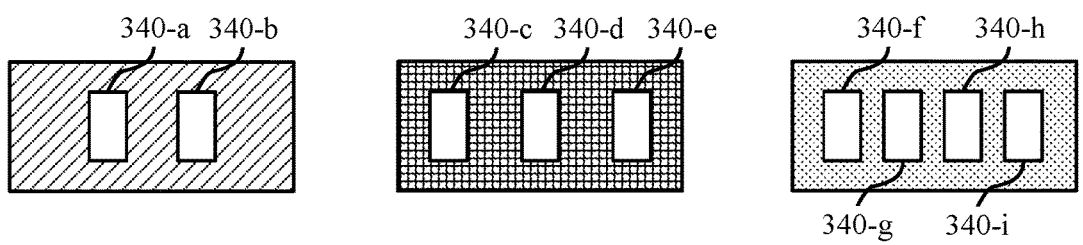

FIG. 3B illustrates an example of search space configurations 301 that support search space configurations for multi-component carrier scheduling in accordance with aspects of the present disclosure in accordance with aspects of the present disclosure. The search space configurations 301 may be used for single component carrier scheduling or multi-component carrier scheduling. The search space configurations may be implemented by a base station or a UE, which may be examples of a base station and UE as described with reference to FIGS. 1 through 3A. In some cases, a UE may monitor one or more of the search spaces for PDCCH candidates. Additionally or alternatively, other wireless devices, such as a base station, may monitor one or more of the search spaces.

As described herein, a UE may be connected with a base station over one or more component carriers, such as component carriers 325-a and 325-b. Component carrier 325-a may be the same component carrier as the second component carrier (e.g., non-DSS SCell) described with reference to FIG. 3A, and component carrier 325-b may be the same component carrier as the first component carrier (e.g., DSS PCell) as described with reference to FIG. 3A. In some cases, component carrier 325-a may be configured with larger subcarrier spacing than component carrier 325-b and the time duration (e.g., slot duration, symbol duration) of component carrier 325-a may be smaller than the time duration of component carrier 325-b. For example, component carrier 325-a may have a subcarrier spacing of 30 kHz, and component carrier 325-b may have a subcarrier spacing of 15 kHz. As such, the slot duration for component carrier 325-a may be half as much as the slot duration for component carrier 325-b. As described with reference to FIG. 3A, a base station may jointly schedule component carriers such as component carrier 325-a and component carrier 325-b. In some implementations, multi-component carrier scheduling may be processed by a UE as if the multi-component carrier scheduling were a virtual component carrier that includes component carrier 325-a and component carrier 325-b.

A search space 330 may be configured and allocated for scheduling data transmissions on the virtual component carrier. For example, a first search space 330-a may be allocated for scheduling component carrier 325-b, a second search space 330-b may be allocated for scheduling component carrier 325-a, and third search space 330-c may be allocated for scheduling the virtual component carrier (e.g., jointly scheduling component carrier 325-a and 325-b). In some cases, the first search space 330-a, the second search space 330-b, and the third search space 330-c may be separate search spaces, including separate resources. In some cases, each search space 330 may be configured with one or more PDCCH candidates 340. The first search space 330-a may be configured with PDCCH candidates 340-a and 340-b, the second search space 330-b may be configured with PDCCH candidates 340-c, 340-d, and 340-e, and the third space may be configured with PDCCH candidates 340-f, 340-g, 340-h, and 340-i. In some cases, each PDCCH candidate 340 may be different.

The UE may monitor one or more search spaces 330 for PDCCH candidates 340 for DCIs within a received PDCCH for a scheduled component carrier such as component carrier 325-a, component carrier 325-b, or a virtual component carrier. For example, a UE may monitor one or more of the first search space 330-a, the second search space 330-b, and the third search space 330-c. Specifically, within each search space 330 in slot 345-a, the UE may monitor for the PDCCH candidates 340. If the UE receives a PDCCH in slot 345-a on component carrier 325-a associated with one of the PDCCH candidates 340 in the first search space 330-a, the UE may determine that the received PDCCH contains DCI that schedules one or more data transmissions on component carrier 325-b. In some cases, the DCI may schedule data transmissions in slot 345-f of component carrier 325-b. If the UE receives a PDCCH in slot 345-b on component carrier 325-a associated with one of the PDCCH candidates 340 in the second search space 330-b, the UE may determine that the received PDCCH contains DCI that schedules one or more data transmissions on component carrier 325-a. In some cases, the DCI may schedule data transmissions in slot 345-c on component carrier 325-a. If the UE receives a PDCCH in slot 345-d on component carrier 325-a associated with one of the PDCCH candidates 340 in the third search space 330-c, the UE may determine that the received PDCCH contains DCI that schedules one or more data transmissions on the virtual component carrier such that the DCI jointly schedules data transmissions on component carriers 325-a and 325-b. In some cases, the joint-DCI may schedule data transmissions in slot 345-e on component carrier 325-a and data transmissions in slot 345-g on component carrier 325-b.

In some implementations, each component carrier 325 may be assigned a component carrier index that distinguishes the component carriers 325. In some cases, a carrier indicator field (CIF) may include one or more values and may be a DCI field included in DCI. Each value in a CIF may be linked to a component carrier 325. In some cases, each of the CIF values may be assigned to a component carrier 325 in higher layer signaling (e.g., radio resource control (RRC) signaling). The CIF may be included in a PDCCH carrying a grant of scheduled resources to indicate on which component carrier 325 the scheduled resources are located. For example, component carrier 325-a, component carrier 325-b, and the virtual component carrier may each be assigned a different component carrier index and each received PDCCH may indicate a CIF value associated with a component carrier index. In some cases, the virtual component carrier may not be assigned a component carrier index, or the virtual component carrier may be assigned a component carrier index but the association from a CIF value to the component carrier index of the virtual component carrier may be configured. As such, the PDCCH received in the third search space 330-c may not include a CIF, or the CIF value corresponding to the virtual component carrier is unknown. Rather than determining which component carrier(s) 325 the PDCCH is associated with by a CIF, the UE may determine the PDCCH schedules resources on the virtual component carrier based on the search space 330 in which the PDCCH was received, or based on the PDCCH candidate 340 in which the PDCCH was received, or a combination thereof. For example, the UE may determine that the received DCI in a PDCCH is associated with jointly scheduling the component carrier 325-a and component carrier 325-b based on a PDCCH candidate 340 on which the DCI was received within the third search space 330 configured for scheduling multiple component carriers 325. In another example, the UE may determine that the received DCI in a PDCCH is associated with jointly scheduling the component carrier 325-a and component carrier 325-b based on the search space configured for scheduling multiple component carriers (e.g., third search space 330-c).

In some implementations, a UE may report the capability signaling of the UE that may indicate the number of PDCCH candidates the UE may be able to monitor for the virtual component carrier. For example, the UE may transmit, to the base station, a UE capability report that includes an indication of how many PDCCH candidates 340 the UE is capable of monitoring within the search space 330 (e.g., the third search space 330-c) for the virtual component carrier, or within a set of consecutive symbols that are configured for monitoring PDCCHs in one or multiple search spaces 330 for the virtual component carrier. In some cases, the network may configure a number of PDCCH candidates 340 for the virtual component carrier based on the capability report. For example, the UE may receive a search space configuration for the virtual component carrier based on the UE capability report, where monitoring the search space configured for scheduling multiple component carriers may be based on the search space configuration for the virtual component carrier.

In some cases, the UE may receive higher layer signaling (e.g., RRC signaling) that includes configuration information for component carrier 325-a, component carrier 325-b, or a virtual component carrier, or a combination thereof. In some cases, the RRC signaling may indicate a search space configuration, PDCCH candidate configuration, virtual component carrier configuration, etc.

In some cases, the configuration of component carriers 325, including the virtual component carrier and corresponding search spaces 330 may be indicated to a UE. For example, a control resource set (CORESET) may include a set of physical resources (e.g., resource element, resource element group (REG), CCE, aggregation level), or a set of parameters (e.g., time domain parameter, frequency domain parameter, or both) that are used to carry a PDCCH and/or DCI. The CORESET and/or search space configuration, including the configuration of one or more virtual component carriers, may be indicated to the UE. In some cases, the component carriers 325 that may be included in the virtual component carrier may be indicated. In some implementations, a separate RRC information element (IE) (e.g., CrossCarrierSchedulingConfig, or a similar IE) may be configured for the one or more virtual component carriers. The information included in the RRC IE may include a scheduling cell ID (e.g., SCell ID, PCell ID), the value of a CIF corresponding to the virtual CC, etc., where the scheduling cell ID may be the cell ID of a real cell (e.g., PCell, SCell), rather than the virtual cell. In some cases, another RRC IE (e.g., SearchSpace) may be configured for the virtual component carrier. The RRC IE may indicate a number of PDCCH candidates per aggregation level that may be included in the virtual search space (e.g., the third search space 330-c). In some implementations, the search space ID of the virtual component carrier may be the same as the search space ID of the scheduling component carrier (e.g., PCell, SCell) such that a linkage may be established.

For scheduling component carrier 325-b (e.g., PCell), two search spaces may be configured. The first search space may be a common search space with search space ID of zero (e.g., search space ID #0) for example. The DCI format associated with the first search space may not include a CIF (e.g., DCI 0_0/1_0 (no CIF)). For component carrier 325-b, a UE specific search space may be configured that may have a search space ID of one (e.g., search space ID #1). The DCI format associated with this second search space may or may not include CIFs (e.g., DCI 0_0/1_0 (no CIF), 0_1/1_1 (with CIF), and/or 0_2/1_2 (with CIF)). A second component carrier (e.g., component carrier 325-a) may be configured with a search space that may be given a search space ID of one (e.g., search space ID #1) so the search space of the second component carrier may be linked with the search space of the first component carrier that was given a search space ID of one. The DCI format associated with this search space of the second component carrier may include CIFs (e.g., DCI 0_1/1_1 (with CIF), and/or 0_2/1_2 (with CIF)). A search space for the virtual component carrier may also be configured. In some cases, the virtual component carrier search space may be given a search space ID of one (e.g., search space ID #1) so linkage between the first and second component carrier search spaces may be available. The DCI format associated with the virtual component carrier search space may include CIFs (e.g., DCI 0_1/1_1 (with CIF) and/or 0_2/1_2 (with CIF)). In some cases, each CIF may include two bits.

Figure 4A:
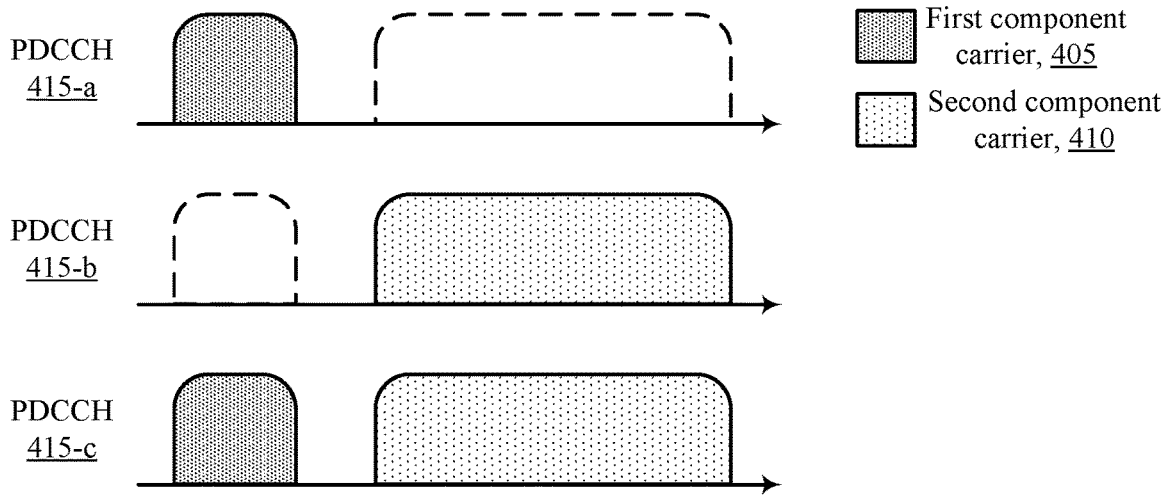
FIG. 4A illustrates an example of component carrier scheduling that supports search space configurations for multi-component carrier scheduling in accordance with aspects of the present disclosure.

FIG. 4A illustrates an example of component carrier scheduling 400 that supports search space configurations for multi-component carrier scheduling in accordance with aspects of the present disclosure. The component carrier scheduling 400 may include single component carrier scheduling or multi-component carrier scheduling. The component carrier scheduling may be implemented by a base station or a UE, which may be examples of a base station and a UE as described with reference to FIGS. 1 through 3B. In some cases, a base station may implement a multi-component carrier scheduling procedure with a UE. Additionally or alternatively, other wireless devices, such as a UE, may implement the multi-component carrier scheduling procedure.

A UE may be connected with a base station over at least a first component carrier 405 and a second component carrier 410. In some cases, the first component carrier 405 corresponds to a DSS PCell, and second component carrier 410 corresponds to a non-DSS SCell. The base station may transmit scheduling information (e.g., PDCCH, DCI, DCI formats) to the UE over one or more of the component carriers to schedule data transmissions on one or more of the component carriers. For example, a UE may receive PDCCH 415-a over the first component carrier 405 or the second component carrier 410 that schedules one or more data transmissions (e.g., PUSCHs, PDSCHs) on the first component carrier 405. In another example, a UE may receive PDCCH 415-b over the first component carrier 405 or the second component carrier 410 that schedules one or more data transmissions (e.g., PUSCHs, PDSCHs) on the second component carrier 410.

In some cases, the base station may jointly schedule the first component carrier 405 and the second component carrier 410. In some implementations, multi-component carrier scheduling via a single DCI may be processed by a UE as if the UE received multiple DCIs for multi-component carrier scheduling. The behavior of the UE may be similar to cross-carrier scheduling from one component carrier to two component carriers. In some cases, one or more DCIs that schedule multiple component carriers (e.g., a single DCI that schedules the first component carrier 405 and the second component carrier 410) may be processed similarly to two DCIs received by the UE that simultaneously schedule the first component carrier 405 and the second component carrier 410. For example, a UE may receive PDCCH 415-c over the first component carrier 405 or the second component carrier 410, in a search space associated with scheduling the first component carrier 405 or a search space associated with scheduling the second component carrier 410, that jointly schedules one or more data transmissions (e.g., PUSCHs, PDSCHs) on the first component carrier 405 and the second component carrier 410.

Figure 4B:
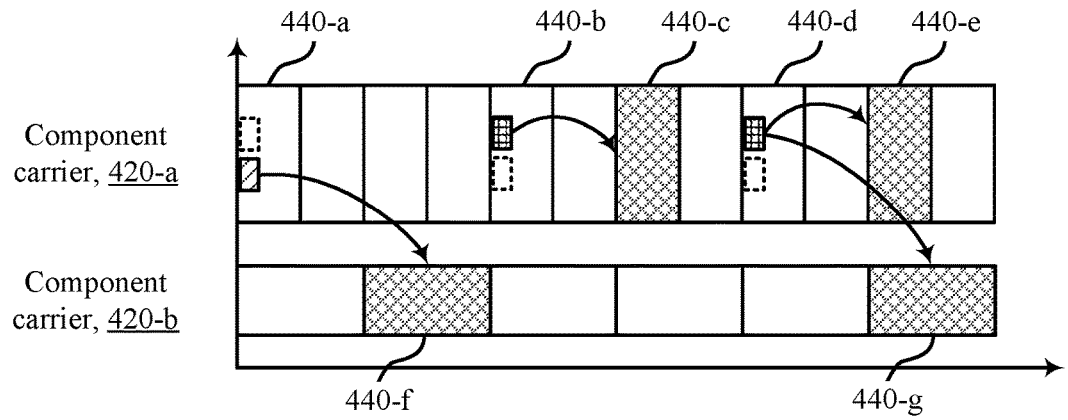
FIG. 4B illustrates an example of search space configurations that support search space configurations for multi-component carrier scheduling in accordance with aspects of the present disclosure.
Figure 4B:
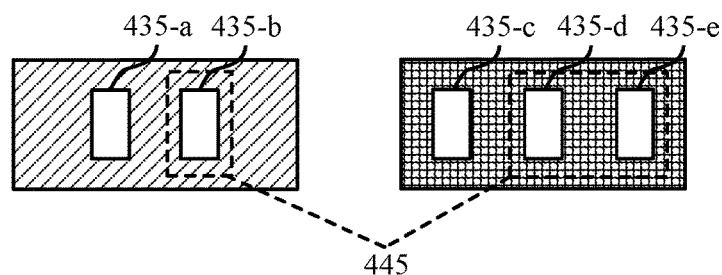

FIG. 4B illustrates an example of search space configurations 401 that supports search space configurations for multi-component carrier scheduling in accordance with aspects of the present disclosure. The search space configurations 401 may be used for single component carrier scheduling or multi-component carrier scheduling. The search space configurations may be implemented by a base station or a UE, which may be examples of a base station and UE as described with reference to FIGS. 1 through 4A. In some cases, a UE may monitor one or more of the search spaces for PDCCH candidates. Additionally or alternatively, other wireless devices, such as a base station, may monitor one or more of the search spaces.

As described herein, a UE may be connected with a base station over one or more component carriers, such as component carriers 420-a and 420-b. Component carrier 420-a may be the same component carrier as the second component carrier (e.g., non-DSS SCell) described with reference to FIG. 4A, and component carrier 420-*b* may be the same component carrier as the first component carrier (e.g., DSS PCell) as described with reference to FIG. 4A. In some cases, component carrier 420-*a* may be configured with larger subcarrier spacing than component carrier 420-*b* and the time duration (e.g., slot duration, symbol duration) of component carrier 420-*a* may be smaller than the time duration of component carrier 420-*b*. For example, component carrier 420-*a* may have a subcarrier spacing of 30 kHz, and component carrier 420-*b* may have a subcarrier spacing of 15 kHz. As such, the slot duration for component carrier 420-*a* may be half as much as the slot duration for component carrier 420-*b*. As described with reference to FIG. 4A, a base station may jointly schedule component carriers such as component carrier 420-*a* and component carrier 420-*b*. In some implementations, multi-component carrier scheduling via a single DCI may be processed by a UE as if the UE received multiple DCIs for multi-component carrier scheduling.

A search space 425 may be configured and allocated for each scheduled component carrier, such as component carriers 420-*a* and 420-*b*. For example, a first search space 425-*a* may be allocated for scheduling component carrier 420-*b*, and a second search space 425-*b* may be allocated for scheduling component carrier 420-*a*. In some cases, the first search space 425-*a*, and the second search space 425-*b* may be separate search spaces. In some cases, each search space 425 may be configured with one or more PDCCH candidates 435 for each scheduled component carrier 420. The first search space 425-*a* may be configured with PDCCH candidates 435-*a* and 435-*b*, and the second search space 425-*b* may be configured with PDCCH candidates 435-*c*, 435-*d*, and 435-*e*. In some cases, each PDCCH candidate 435 may be different. The UE may also be configured with a number of PDCCH candidates 435 for joint component carrier scheduling. In some cases, the joint component carrier scheduling PDCCH candidates 435 are a subset of the PDCCH candidates 435 for one or both of the scheduled component carriers 420. For example, PDCCH candidate 435-*b* of the first search space 425-*a*, and PDCCH candidates 435-*d* and 435-*e* of the second search space 425-*b* may be allocated for joint component carrier scheduling and may be referred to as a second subset 445 of PDCCH candidates 435. PDCCH candidate 435-*a* and 435-*c* may be allocated for single component carrier scheduling and may be referred to as a first subset of PDCCH candidates 435.

The UE may monitor PDCCH candidates 435 in one or more search spaces 425 for a received PDCCH associated with a scheduled component carrier such as component carrier 420-*a*, or component carrier 420-*b*. For example, a UE may monitor one or more of the first search space 425-*a*, or the second search space 425-*b*. Specifically, within each search space 425 in slot 440-*a*, the UE may monitor for the PDCCH candidates 435. If the UE receives a PDCCH in slot 440-*a* on component carrier 420-*a* associated with a first subset of PDCCH candidates 435 in the first search space 425-*a*, the UE may determine that the received PDCCH contains DCI that schedules one or more data transmissions on component carrier 420-*b*. In some cases, the DCI may schedule data transmissions in slot 440-*f* of component carrier 420-*b*. If the UE receives a PDCCH in slot 440-*b* on component carrier 420-*a* associated with a first subset of PDCCH candidates 435 in the second search space 425-*b*, the UE may determine that the received PDCCH contains DCI that schedules one or more data transmissions on component carrier 420-*a*. In some cases, the DCI may schedule data transmissions in slot 440-*c* on component carrier 420-*a*. If the UE receives a PDCCH in slot 440-*d* on component carrier 420-*a* associated with a second subset 445 of PDCCH candidates 435 in the second search space 425-*b*, the UE may determine that the received PDCCH contains DCI that schedules one or more data transmissions on component carriers 420-*a* and 420-*b*. In some cases, the UE may receive a PDCCH that is associated with a second subset 445 of PDCCH candidates 435 in the first search space 425-*a*, and the UE may determine that the received PDCCH contains DCI that schedules one or more data transmissions on component carriers 420-*a* and 420-*b*.

In some implementations, each component carrier 420 may be assigned a component carrier index that distinguishes the component carriers 420. A CIF including one or more values may be included in DCI, where each of the CIF values may be assigned to a component carrier in higher layer signaling (e.g., RRC signaling). The CIF may be included in a PDCCH to indicate on which component carrier 420 the scheduled resources are located. For example, component carrier 420-*a*, and component carrier 420-*b* may each be assigned a different component carrier and each received PDCCH may indicate a CIF value associated with a component carrier index.

In some cases, the UE may receive higher layer signaling (e.g., RRC signaling) that includes configuration information for component carrier 420-*a*, or component carrier 420-*b*, or a combination thereof. In some cases, the RRC signaling may indicate a search space configuration, PDCCH candidate configuration, etc. For example, RRC signaling may indicate the PDCCH candidates 435 that are allocated for single component carrier scheduling, and which are allocated for joint-component component carrier scheduling such as the second subset 445 of PDCCH candidates 435.

In some cases, the PDCCH candidates 435 that are allocated to joint component carrier scheduling may be mapped on either the first search space 425-*a* or the second search space 425-*b*, or both search spaces 425, where the mapping may be based on the DCI size for each search space 425. In some cases, the DCI size for each search space may be based on the configuration of the search space, or the configuration of the component carrier 420 the search space 425 is associated with. For example, the DCI size may be based on the frequency domain bandwidth of the component carrier 420. The larger the frequency domain bandwidth, the more bits a DCI may have. For example, the frequency domain bandwidth of component carrier 420-*b* may be lower than the frequency domain bandwidth of component carrier 420-*c*. As such, the DCI configured for component carrier 420-*b* may include less bits than the DCI configured for component carrier 420-*a*. As an example, the DCI for component carrier 420-*b* may include 10 bits and the DCI for component carrier 420-*a* may include 16 bits. The size of the DCI that is configured for joint-component carrier scheduling may be configured to be the same size as the DCI associated with the search space 425 in which the joint scheduling DCI is configured. Based on the original configurations of DCI sizes for each single component carrier, bits may be added or removed to the DCI associated with joint-component carrier scheduling so the joint-component carrier DCI is the same size as a single component carrier DCI.

If the DCI size monitored on a search space 425 for either component carrier 420-*a* or component carrier 420-*b* is smaller than the DCI size for joint component carrier scheduling, the PDCCH candidates for the joint-component carrier DCI may be mapped on the search space 425. For the joint-component carrier DCI, zeros may be assumed as the most significant bit (MSB) and least significant bit (LSB) so that the size of the joint-component carrier DCI is aligned with the size of the DCI for the component carrier 420 associated with the search space 425 the joint-component carrier DCI is mapped on. Additionally or alternatively, if the DCI size monitored on a search space 425 for either component carrier 420-*a* or component carrier 420-*b* is larger than the DCI size for joint component carrier scheduling, the PDCCH candidates for the joint-component carrier DCI may be mapped on the search space 425. For the joint-component carrier DCI, DCI bits may be appended as MSB/LSB so that the size of the joint-component carrier DCI is aligned with the size of the DCI for the component carrier 420 associated with the search space 425 the joint-component carrier DCI is mapped on.

For example, the DCI size for component carrier 420-*b* may be 10 bits, the DCI size for component carrier 420-*a* may be 16 bits, and the DCI size for joint-component carrier scheduling may be 14 bits. If the joint DCI is configured in the first search space 425-*a* associated with the component carrier 420-*b*, then the size of the joint-component carrier DCI is larger than the DCI for component carrier 420-*b*, so four bits may be removed from the joint-component carrier DCI so the joint-component carrier DCI is the same size as the DCI for component carrier 420-*a*. In another example, if the joint-component carrier DCI is configured in the second search space 425-*b* associated with component carrier 420-*a*, then the size of the joint-component carrier DCI is smaller than the DCI for component carrier 420-*a*, so two bits may be added to the joint-component carrier DCI so the size of the joint-component carrier DCI is the same size as the DCI for component carrier 420-*a*.

In some cases, the configuration of component carriers, and corresponding search spaces may be indicated to a UE. A CORESET and/or search space configuration, including the configuration of one or more component carriers 420, and multi-component carrier scheduling, may be indicated to the UE. In some cases, multi-component carrier DCI monitoring may be configured on a search space 425 when the scheduling component carrier (e.g., SCell, PCell) is configured (e.g., via a DCI formation such as DCI format 2_0). In some cases, search space 425 may be configured on the scheduling component carrier 420 to enable single-DCI to single-component carrier scheduling. An additional configuration may be indicated to the UE to indicate which PDCCH candidates in which search space 425 for which scheduling component carrier 420 the multi-component carrier DCI is mapped. As such, the UE may be configured with search spaces 425 for single-component carrier scheduling to the component carriers 420 in the set of multi-component carrier scheduling.

For scheduling component carrier 420-*b* (e.g., PCell), two search spaces 425 may be configured. The first search space 425 may be a common search space with a search space ID of zero (e.g., search space ID #0) for example. The DCI format associated with the first search space 425 may not include a CIF (e.g., DCI 0_0/1_0 (no CIF)). For component carrier 420-*b*, a UE specific search space may be configured that may have a search space ID of one (e.g., search space ID #1). The DCI format associated with this second search space 425 may or may not include CIFs (e.g., DCI 0_0/1_0 (no CIF), 0_1/1_1 (with CIF), and/or 0_2/1_2 (with CIF)). Component carrier 420-*a* may be configured with a search space 425 that may be given a search space ID of one (e.g., search space ID #1) so this search space 425 of component carrier 420-*a* may be linked with the search space 425 of component carrier 420-*b* that was given a search space ID of one. The DCI format associated with this search space 425 of component carrier 420-*a* may include CIFs (e.g., DCI 0_1/1_1 (with CIF), and/or 0_2/1_2 (with CIF)). In some cases, for joint-component carrier scheduling (e.g., jointly scheduling the first component carrier and the second component carrier), positions of joint-DCI candidates in the configured search spaces 425 may be configured by higher layer scheduling. As two component carriers 420 are configured, the CIF may be one bit. In some cases, a mean may be indicated to differentiate between a DCI for component carrier 420-*b* or component carrier 420-*a*, or a DCI for the joint-component carrier scheduling. In some cases, a radio network temporary identifier (RNTI) or scrambling sequence may be indicated for this DCI.

Figure 5:
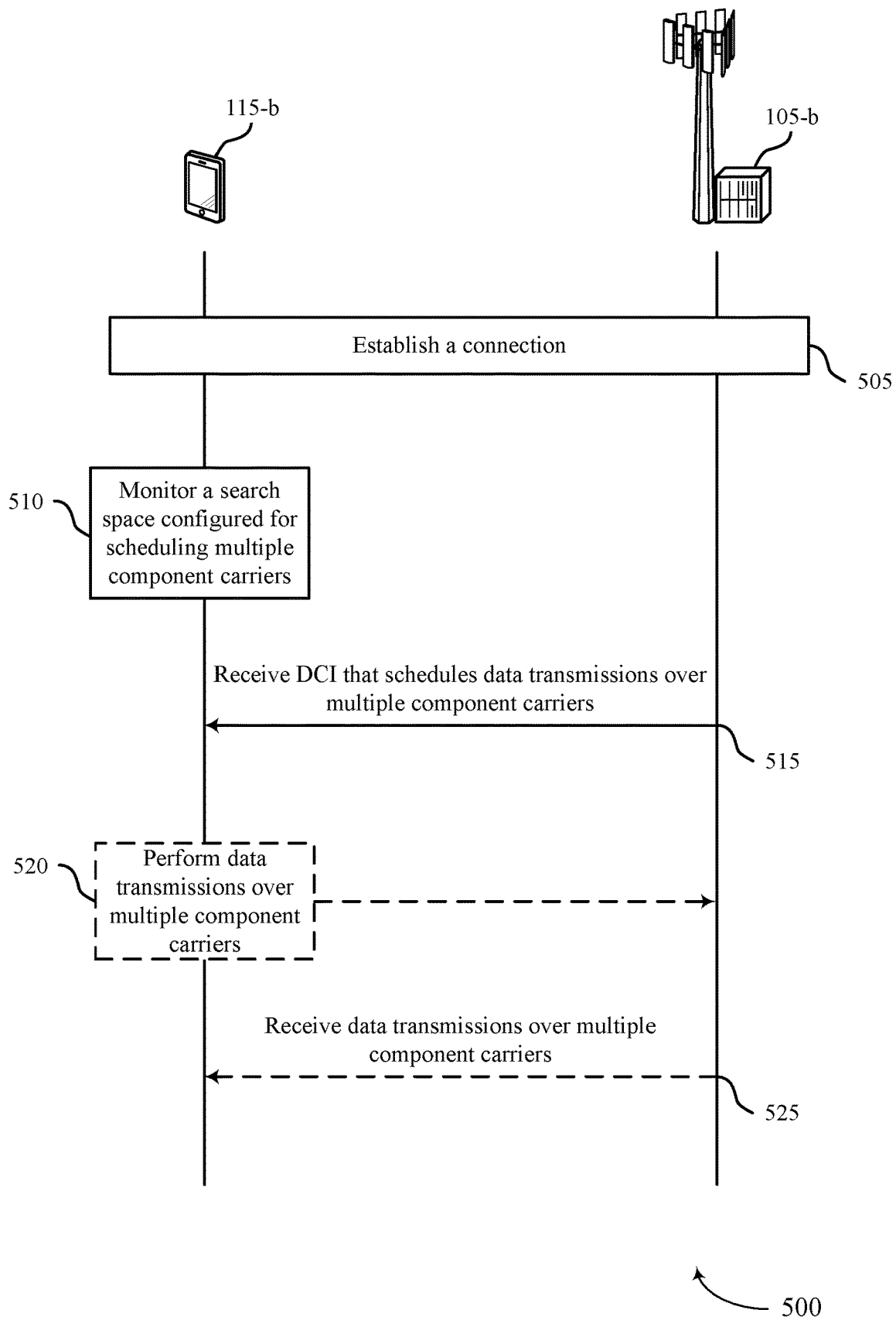
FIG. 5 illustrates an example of a process flow that supports search space configurations for multi-component carrier scheduling in accordance with aspects of the present disclosure.

FIG. 5 illustrates an example of a process flow 500 that supports search space configurations for multi-component carrier scheduling in accordance with aspects of the present disclosure. The process flow 500 may illustrate an example multi-component carrier scheduling procedure. For example, base station 105-*b* may configure a PDCCH that simultaneously schedules multiple component carriers and transmit the PDCCH to UE 115-*b*. Base station 105-*b* and UE 115-*b* may be examples of the corresponding wireless devices described with reference to FIGS. 1 through 4B. In some cases, instead of base station 105-*b* implementing the multi-component carrier scheduling, a different type of wireless device (e.g., a UE 115) may perform the scheduling. Alternative examples of the following may be implemented, where some steps are performed in a different order than described or are not performed at all. In some cases, steps may include additional features not mentioned below, or further steps may be added.

At 505, UE 115-*b* may establish a connection, with base station 105-*b*, over at least a first component carrier and a second component carrier. The first component carrier may correspond to a PCell and the second component carrier may correspond to an SCell, or vice versa. In some cases, the PCell may support DSS and the SCell may not support DSS.

At 510, UE 115-*b* may monitor a search space configured for scheduling multiple component carriers, such as the first component carrier and the second component carrier. In some cases, UE 115-*b* may receive configuration information for a virtual component carrier associated with scheduling multiple component carriers. The configuration information may include an indication of a search space of the virtual component carrier, where the search space of the virtual component carrier includes the search space configured for scheduling multiple component carriers. The search space for the virtual component carrier may be separate from a search space for the first component carrier and a search space for the second component carrier.

In some cases, rather than scheduling a virtual component carrier via a separate search space, UE 115-*b* may monitor one or more of: a first portion of a first search space of the first component carrier or monitor a second portion of a second search space of the second component carrier, or a combination thereof. The first portion of the first search space may include a first subset of a first set of PDCCH candidates in the first search space, and the second portion of the second search space may include a second subset of a second set of PDCCH candidates in the second search space. UE 115-*b* may receive RRC signaling identifying one or more of the first subset of the first set of PDCCH candidates or the second subset of the second set of PDCCH candidates as being associated with simultaneously scheduling the first component carrier and the second component carrier.

At 515, UE 115-*b* may receive DCI from base station 105-*b* based on the monitoring, the DCI scheduling a set of data transmissions over the first component carrier and the second component carrier. In some cases, the data transmission may be uplink data transmissions configured and transmitted by UE 115-*b*, or may be downlink data transmissions transmitted by base station 105-*b* to UE 115-*b*, or both.

If the received DCI schedules uplink data transmissions, at 520, UE 115-*b* may perform and transmit the set of data transmissions over the first component carrier and the second component carrier based on the DCI.

If the received DCI schedules downlink data transmissions, at 525, UE 115-*b* may receive the set of data transmissions over the first component carrier and the second component carrier based on the DCI.

Figure 6:
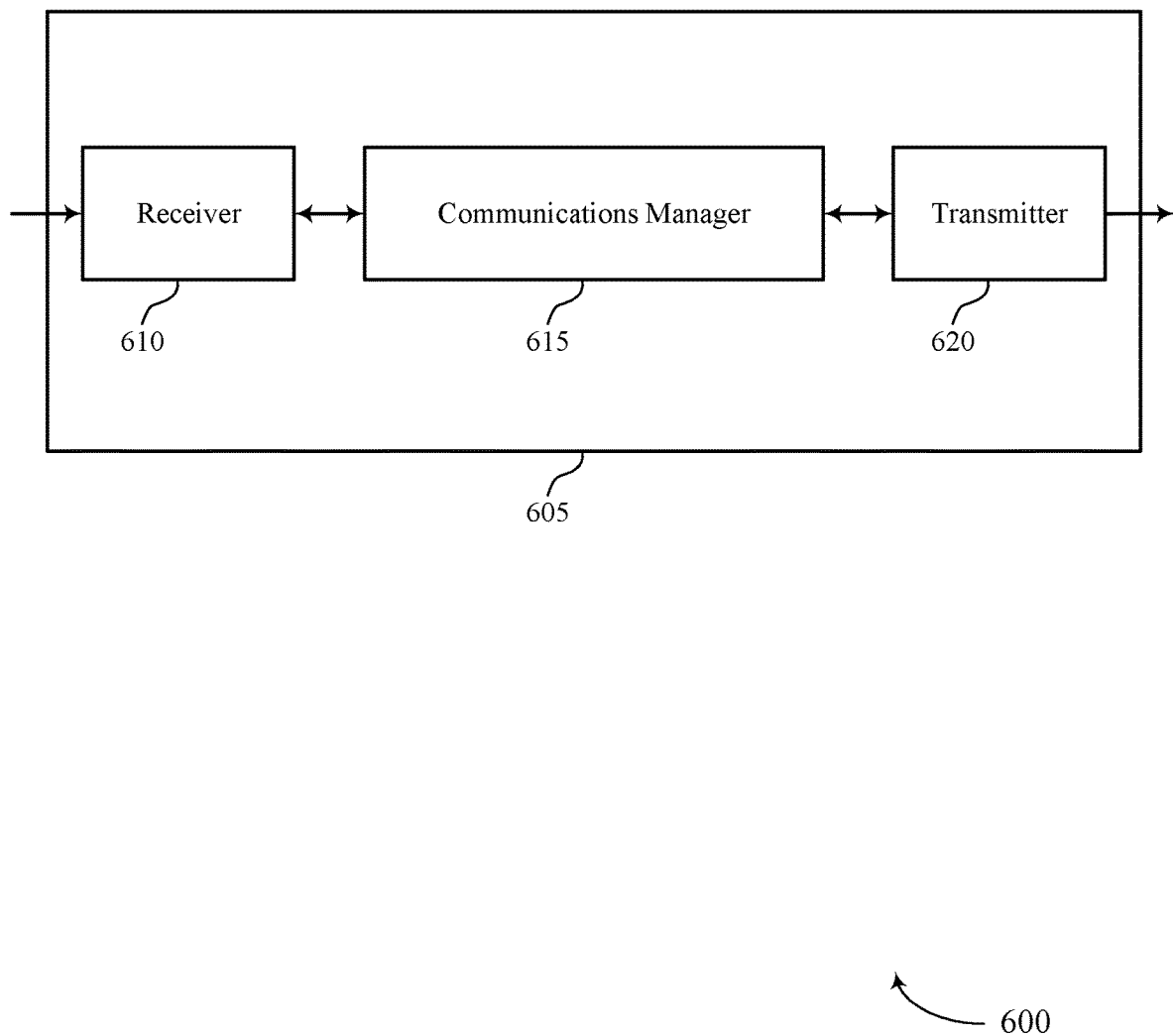
FIGS. 6 and 7 show block diagrams of devices that support search space configurations for multi-component carrier scheduling in accordance with aspects of the present disclosure.

FIG. 6 shows a block diagram 600 of a device 605 that supports search space configurations for multi-component carrier scheduling in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to search space configurations for multi-component carrier scheduling, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish a connection, with a base station, over at least a first component carrier and a second component carrier, monitor a search space configured for scheduling multiple component carriers, receive DCI from the base station based on the monitoring, the DCI scheduling a set of data transmissions over the first component carrier and the second component carrier, and perform or receive the set of data transmissions over the first component carrier and the second component carrier based on the DCI. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to more efficiently and reliably schedule multiple component carriers. For example, a device 605 may receive a single PDCCH on a non-DSS carrier that indicates scheduled data transmissions on multiple component carrier to increase spectral efficiency.

Based on implementing the multi-component carrier scheduling techniques as described herein, a processor of a UE 115 (e.g., controlling the receiver 610, the transmitter 620, or the transceiver 920 as described with reference to FIG. 9) may increase reliability and efficiency in the communication of multi-component carrier scheduling between a UE 115 and a base station.

Figure 7:
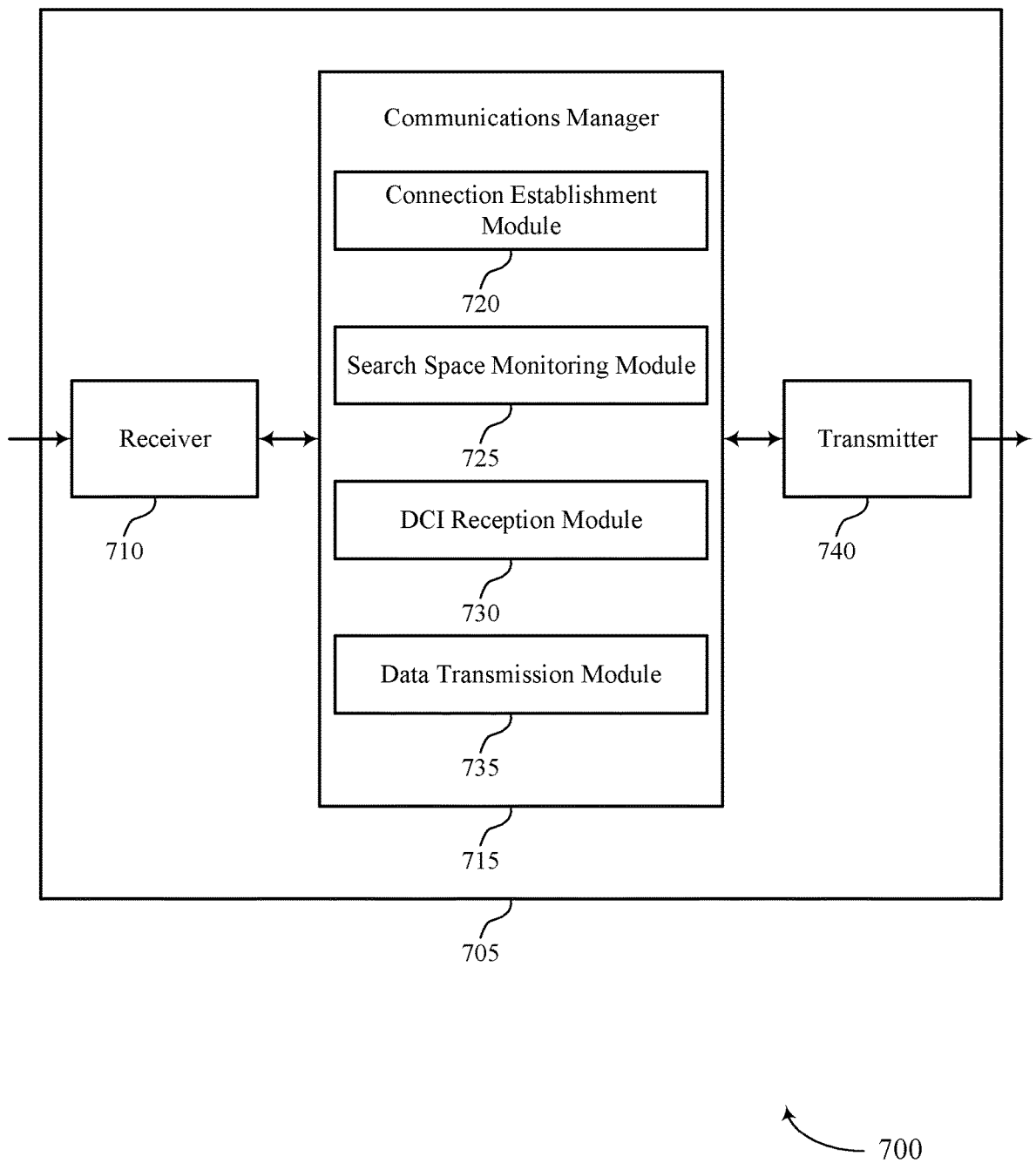

FIG. 7 shows a block diagram 700 of a device 705 that supports search space configurations for multi-component carrier scheduling in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to search space configurations for multi-component carrier scheduling, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a connection establishment module 720, a search space monitoring module 725, a DCI reception module 730, and a data transmission module 735. The communications manager 715 may be an example of aspects of the communications manager 910 described herein.

The connection establishment module 720 may establish a connection, with a base station, over at least a first component carrier and a second component carrier. The search space monitoring module 725 may monitor a search space configured for scheduling multiple component carriers. The DCI reception module 730 may receive DCI from the base station based on the monitoring, the DCI scheduling a set of data transmissions over the first component carrier and the second component carrier. The data transmission module 735 may perform or receive the set of data transmissions over the first component carrier and the second component carrier based on the DCI.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
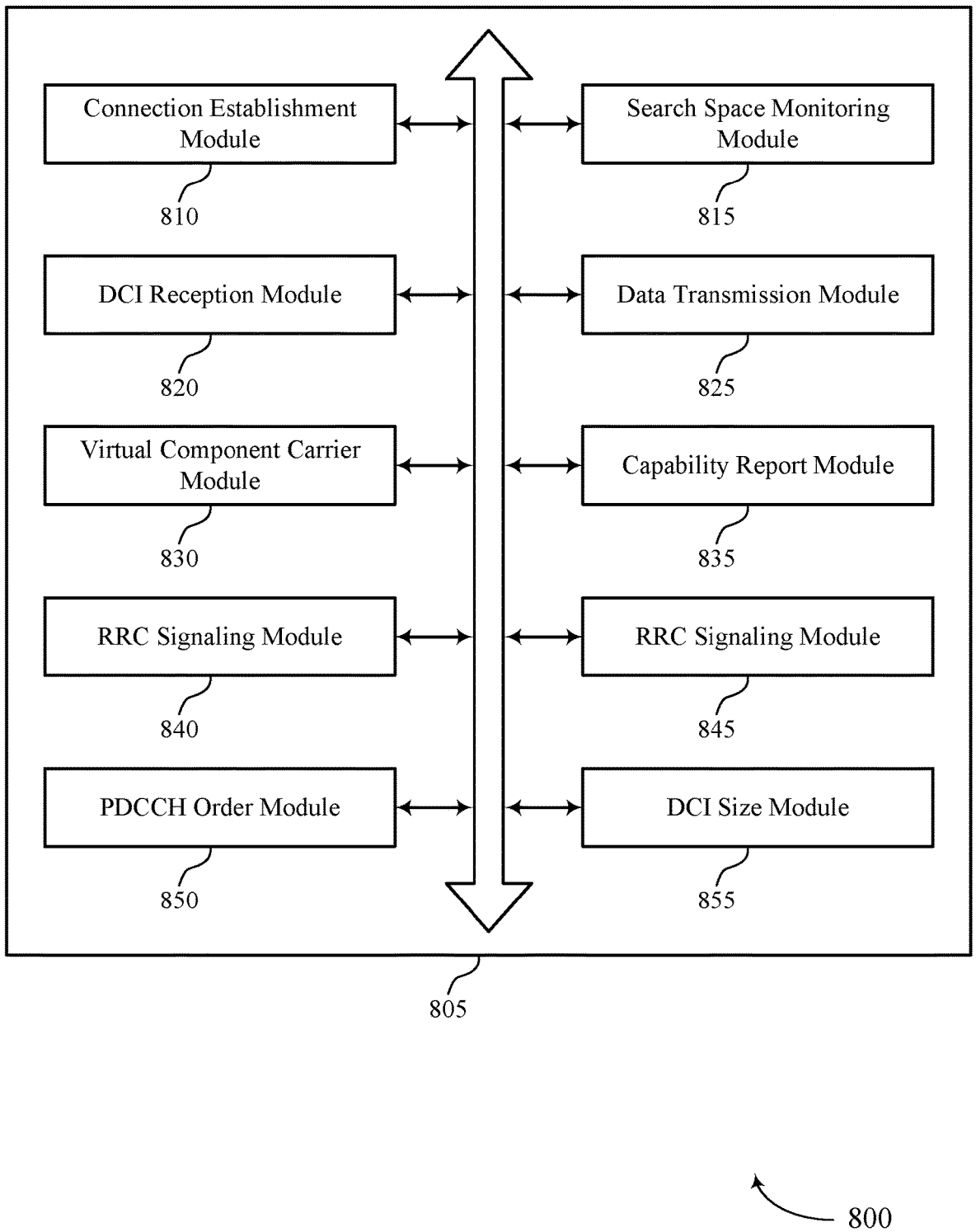
FIG. 8 shows a block diagram of a communications manager that supports search space configurations for multi-component carrier scheduling in accordance with aspects of the present disclosure.

FIG. 8 shows a block diagram 800 of a communications manager 805 that supports search space configurations for multi-component carrier scheduling in accordance with aspects of the present disclosure. The communications manager 805 may be an example of aspects of a communications manager 615, a communications manager 715, or a communications manager 910 described herein. The communications manager 805 may include a connection establishment module 810, a search space monitoring module 815, a DCI reception module 820, a data transmission module 825, a virtual component carrier module 830, a capability report module 835, an RRC signaling module 840, an RRC signaling module 845, a PDCCH order module 850, and a DCI size module 855. Each of these modules may communicate, directly or indirectly, with one another (e.g., via one or more buses).

The connection establishment module 810 may establish a connection, with a base station, over at least a first component carrier and a second component carrier. The search space monitoring module 815 may monitor a search space configured for scheduling multiple component carriers. The DCI reception module 820 may receive DCI from the base station based on the monitoring, the DCI scheduling a set of data transmissions over the first component carrier and the second component carrier. The data transmission module 825 may perform or receive the set of data transmissions over the first component carrier and the second component carrier based on the DCI.

In some examples, the search space monitoring module 815 may monitor one or more of: a first portion of a first search space of the first component carrier or monitoring a second portion of a second search space of the second component carrier, or a combination thereof. In some cases, the first portion of the first search space includes a first subset of a first set of PDCCH candidates in the first search space, and the second portion of the second search space includes a second subset of a second set of PDCCH candidates in the second search space. In some cases, the search space configured for scheduling multiple component carriers is in a non-DSS Scell.

The virtual component carrier module 830 may receive configuration information for a virtual component carrier associated with scheduling multiple component carriers, the configuration information including an indication of a search space of the virtual component carrier, where the search space of the virtual component carrier includes the search space configured for scheduling multiple component carriers. In some examples, the virtual component carrier module 830 may determine that the received DCI is associated with scheduling the first component carrier and the second component carrier based on a presence of the CIF value assigned to the virtual component carrier in the received DCI. In some examples, the virtual component carrier module 830 may determine that the received DCI is associated with scheduling the first component carrier and the second component carrier based on a PDCCH candidate on which the DCI is received within the search space configured for scheduling multiple component carriers.

In some examples, the virtual component carrier module 830 may determine that the received DCI is associated with scheduling the first component carrier and the second component carrier based on the search space configured for scheduling multiple component carriers. In some examples, the virtual component carrier module 830 may receive a search space configuration for the virtual component carrier based on the UE capability report, where monitoring the search space configured for scheduling multiple component carriers is based on the search space configuration for the virtual component carrier. In some cases, the search space for the virtual component carrier is separate from a search space for the first component carrier and a search space for the second component carrier. In some cases, the configuration information includes a CIF value assigned to the virtual component carrier.

The capability report module 835 may transmit, to the base station, a UE capability report including an indication of how many PDCCH candidates the UE is capable of monitoring within the search space for the virtual component carrier. The RRC signaling module 840 may receive RRC signaling including the configuration information for the virtual component carrier. The RRC signaling module 845 may receive RRC signaling identifying one or more of the first subset of the first set of PDCCH candidates or the second subset of the second set of PDCCH candidates as being associated with simultaneously scheduling the first component carrier and the second component carrier.

The PDCCH order module 850 may identify one or more of the first subset of the first set of PDCCH candidates or the second subset of the second set of PDCCH candidates based on an order of PDCCH candidates within the first search space or the second search space. The DCI size module 855 may identify one or more of the first subset of the first set of PDCCH candidates or the second subset of the second set of PDCCH candidates based on a DCI size difference between the first search space and the second search space.

Figure 9:
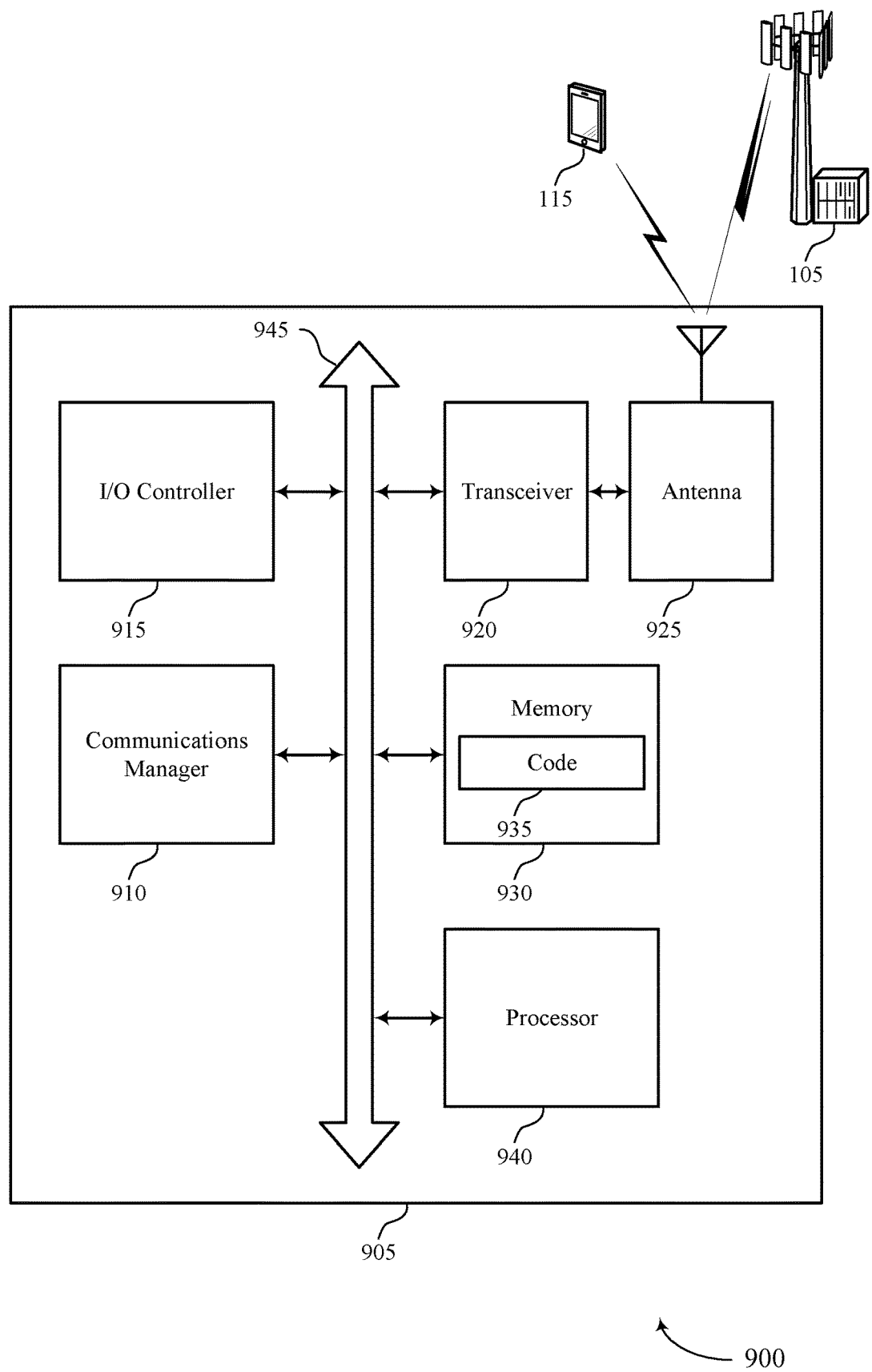
FIG. 9 shows a diagram of a system including a device that supports search space configurations for multi-component carrier scheduling in accordance with aspects of the present disclosure.

FIG. 9 shows a diagram of a system 900 including a device 905 that supports search space configurations for multi-component carrier scheduling in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish a connection, with a base station, over at least a first component carrier and a second component carrier, monitor a search space configured for scheduling multiple component carriers, receive DCI from the base station based on the monitoring, the DCI scheduling a set of data transmissions over the first component carrier and the second component carrier, and perform or receive the set of data transmissions over the first component carrier and the second component carrier based on the DCI.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include a hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting search space configurations for multi-component carrier scheduling).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The device 905 as described herein may be implemented to realize one or more potential advantages. One implementation may allow the device 905 to more efficiently and reliably schedule multiple component carriers. For example, a device 905 may receive a single PDCCH on a non-DSS carrier that indicates scheduled data transmissions on multiple component carrier to increase spectral efficiency.

Based on implementing the multi-component carrier scheduling techniques as described herein, a processor of a UE 115 (e.g., transceiver 920) may increase reliability and efficiency in the communication of multi-component carrier scheduling between a UE 115 and a base station.

Figure 10:
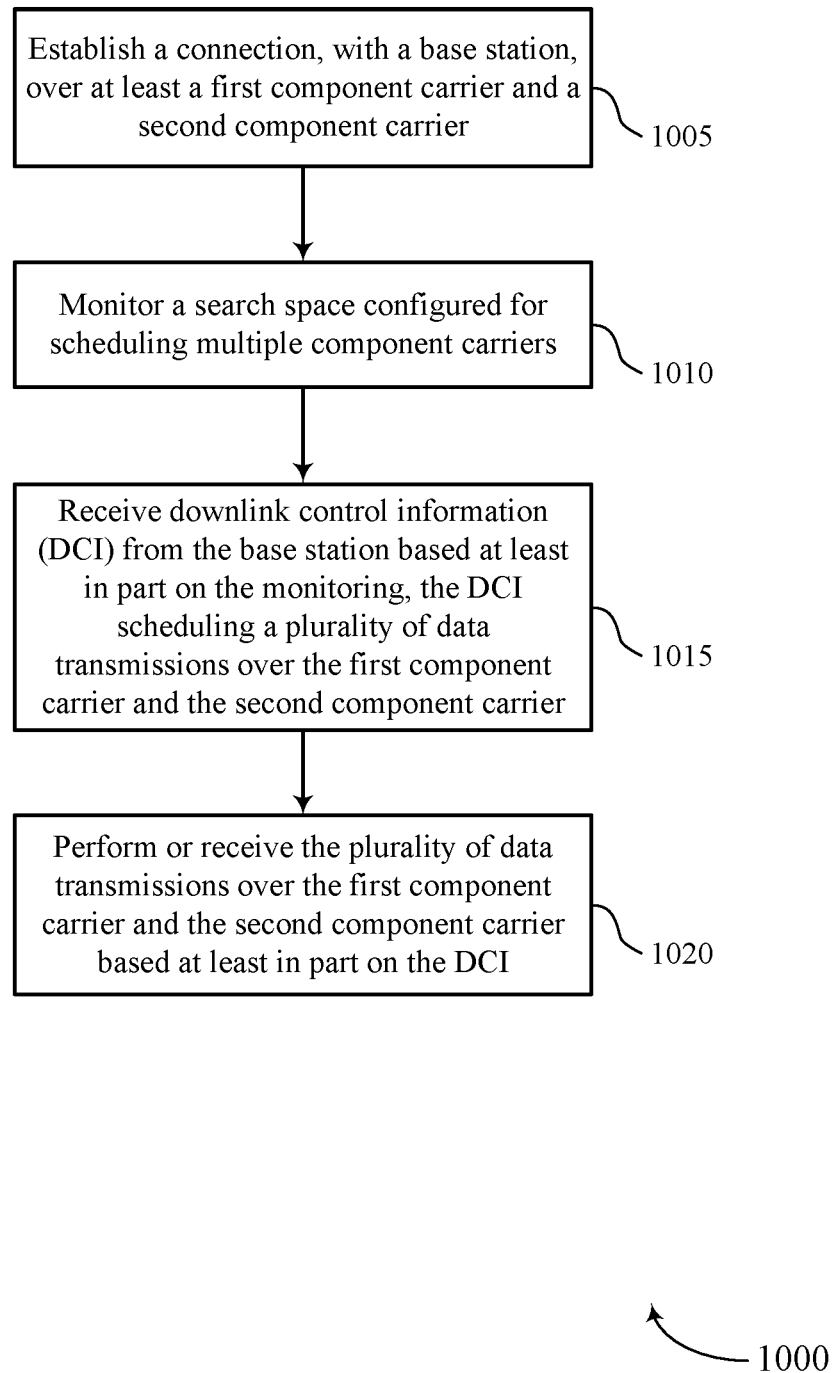
FIGS. 10 through 12 show flowcharts illustrating methods that support search space configurations for multi-component carrier scheduling in accordance with aspects of the present disclosure.

FIG. 10 shows a flowchart illustrating a method 1000 that supports search space configurations for multi-component carrier scheduling in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may establish a connection, with a base station, over at least a first component carrier and a second component carrier. The operations of 1005 may be performed according to the methods described herein. In some examples, aspects of the operations of 1005 may be performed by a connection establishment module as described with reference to FIGS. 6 through 9.

At 1010, the UE may monitor a search space configured for scheduling multiple component carriers. The operations of 1010 may be performed according to the methods described herein. In some examples, aspects of the operations of 1010 may be performed by a search space monitoring module as described with reference to FIGS. 6 through 9.

At 1015, the UE may receive DCI from the base station based at least in part on the monitoring, the DCI scheduling a plurality of data transmissions over the first component carrier and the second component carrier. The operations of 1015 may be performed according to the methods described herein. In some examples, aspects of the operations of 1015 may be performed by a DCI reception module as described with reference to FIGS. 6 through 9.

At 1020, the UE may perform or receive the plurality of data transmissions over the first component carrier and the second component carrier based at least in part on the DCI. The operations of 1020 may be performed according to the methods described herein. In some examples, aspects of the operations of 1020 may be performed by a data transmission module as described with reference to FIGS. 6 through 9.

Figure 11:
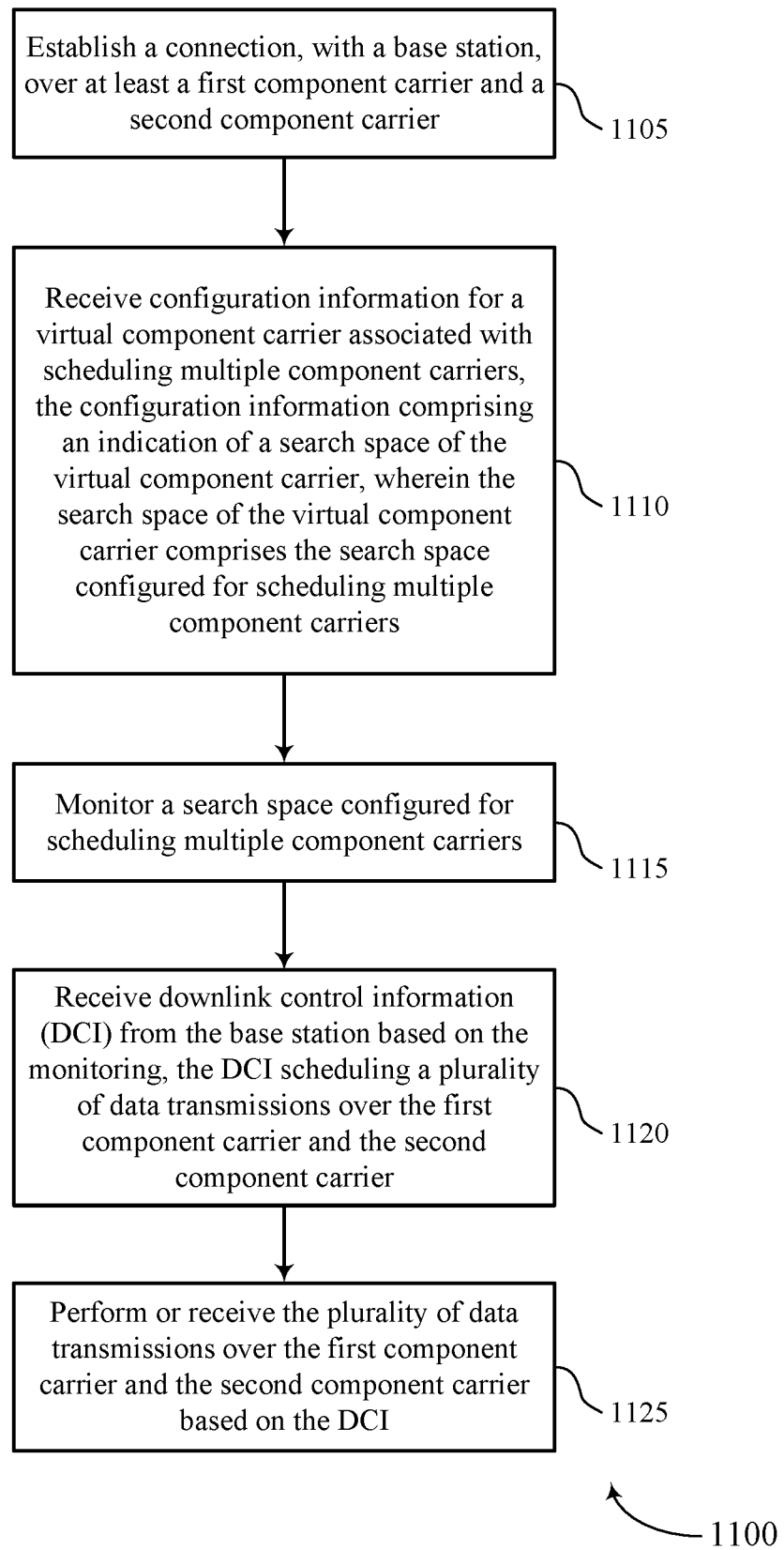

FIG. 11 shows a flowchart illustrating a method 1100 that supports search space configurations for multi-component carrier scheduling in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may establish a connection, with a base station, over at least a first component carrier and a second component carrier. The operations of 1105 may be performed according to the methods described herein. In some examples, aspects of the operations of 1105 may be performed by a connection establishment module as described with reference to FIGS. 6 through 9.

At 1110, the UE may receive configuration information for a virtual component carrier associated with scheduling multiple component carriers, the configuration information including an indication of a search space of the virtual component carrier, where the search space of the virtual component carrier includes the search space configured for scheduling multiple component carriers. The operations of 1110 may be performed according to the methods described herein. In some examples, aspects of the operations of 1110 may be performed by a virtual component carrier module as described with reference to FIGS. 6 through 9.

At 1115, the UE may monitor a search space configured for scheduling multiple component carriers. The operations of 1115 may be performed according to the methods described herein. In some examples, aspects of the operations of 1115 may be performed by a search space monitoring module as described with reference to FIGS. 6 through 9.

At 1120, the UE may receive DCI from the base station based at least in part on the monitoring, the DCI scheduling a plurality of data transmissions over the first component carrier and the second component carrier. The operations of 1120 may be performed according to the methods described herein. In some examples, aspects of the operations of 1120 may be performed by a DCI reception module as described with reference to FIGS. 6 through 9.

At 1125, the UE may perform or receive the plurality of data transmissions over the first component carrier and the second component carrier based at least in part on the DCI. The operations of 1125 may be performed according to the methods described herein. In some examples, aspects of the operations of 1125 may be performed by a data transmission module as described with reference to FIGS. 6 through 9.

Figure 12:
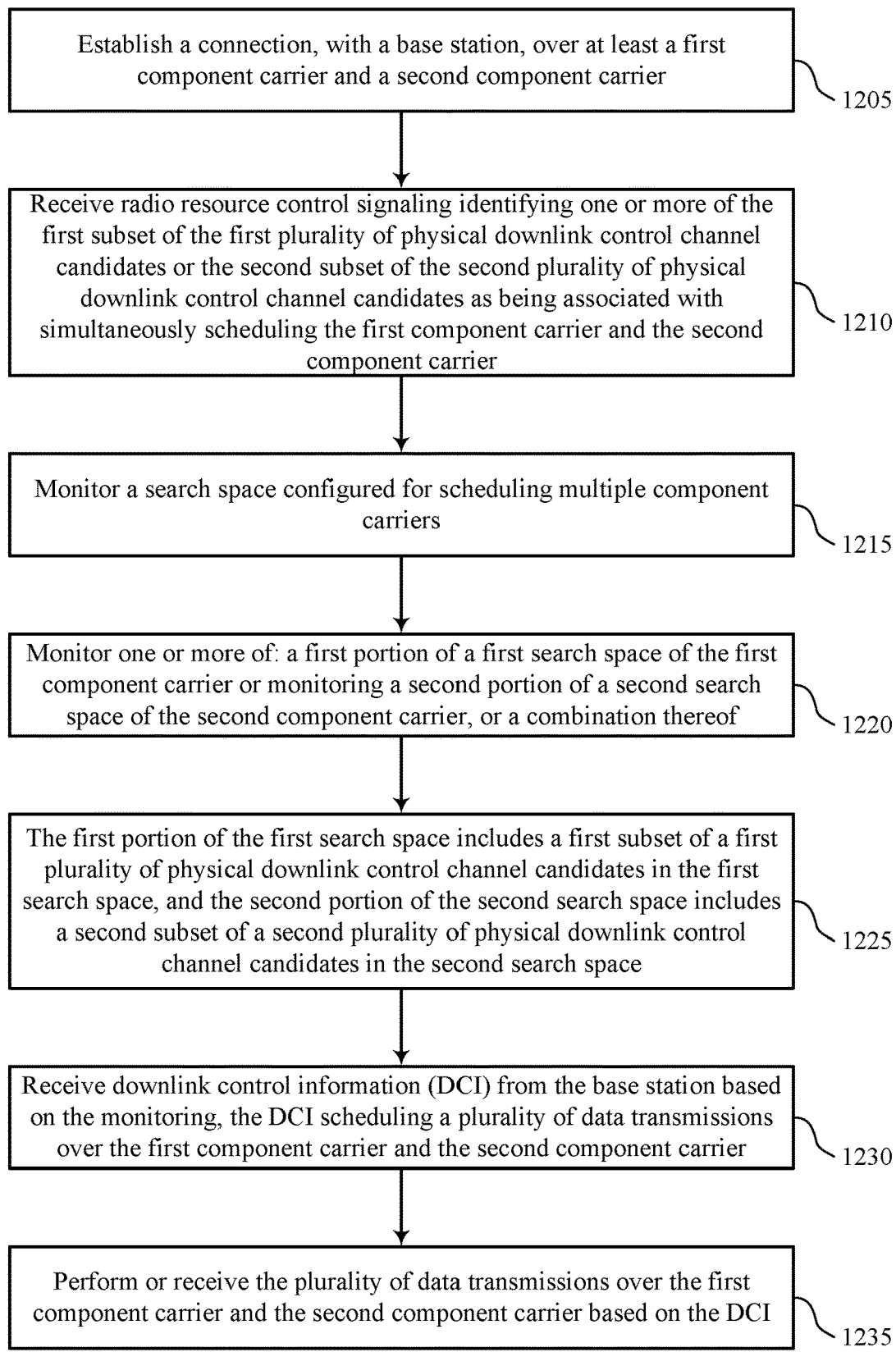

FIG. 12 shows a flowchart illustrating a method 1200 that supports search space configurations for multi-component carrier scheduling in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may establish a connection, with a base station, over at least a first component carrier and a second component carrier. The operations of 1205 may be performed according to the methods described herein. In some examples, aspects of the operations of 1205 may be performed by a connection establishment module as described with reference to FIGS. 6 through 9.

At 1210, the UE may receive RRC signaling identifying one or more of the first subset of the first plurality of PDCCH candidates or the second subset of the second plurality of PDCCH candidates as being associated with simultaneously scheduling the first component carrier and the second component carrier. The operations of 1210 may be performed according to the methods described herein. In some examples, aspects of the operations of 1210 may be performed by an RRC signaling module as described with reference to FIGS. 6 through 9.

At 1215, the UE may monitor a search space configured for scheduling multiple component carriers. The operations of 1215 may be performed according to the methods described herein. In some examples, aspects of the operations of 1215 may be performed by a search space monitoring module as described with reference to FIGS. 6 through 9.

At 1220, the UE may monitor one or more of: a first portion of a first search space of the first component carrier or monitoring a second portion of a second search space of the second component carrier, or a combination thereof. The operations of 1220 may be performed according to the methods described herein. In some examples, aspects of the operations of 1220 may be performed by a search space monitoring module as described with reference to FIGS. 6 through 9.

At 1225, the UE may the first portion of the first search space includes a first subset of a first plurality of PDCCH candidates in the first search space, and the second portion of the second search space includes a second subset of a second plurality of PDCCH candidates in the second search space. The operations of 1225 may be performed according to the methods described herein. In some examples, aspects of the operations of 1225 may be performed by a search space monitoring module as described with reference to FIGS. 6 through 9.

At 1230, the UE may receive DCI from the base station based at least in part on the monitoring, the DCI scheduling a plurality of data transmissions over the first component carrier and the second component carrier. The operations of 1230 may be performed according to the methods described herein. In some examples, aspects of the operations of 1230 may be performed by a DCI reception module as described with reference to FIGS. 6 through 9.

At 1235, the UE may perform or receive the plurality of data transmissions over the first component carrier and the second component carrier based at least in part on the DCI. The operations of 1235 may be performed according to the methods described herein. In some examples, aspects of the operations of 1235 may be performed by a data transmission module as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at UE, comprising: establishing a connection, with a base station, over at least a first component carrier and a second component carrier; monitoring a search space configured for scheduling multiple component carriers; receiving DCI from the base station based at least in part on the monitoring, the DCI scheduling a plurality of data transmissions over the first component carrier and the second component carrier; and performing or receiving the plurality of data transmissions over the first component carrier and the second component carrier based at least in part on the DCI.

Aspect 2: The method of aspect 1, further comprising: receiving configuration information for a virtual component carrier associated with scheduling multiple component carriers, the configuration information comprising an indication of a search space of the virtual component carrier, wherein the search space of the virtual component carrier comprises the search space configured for scheduling multiple component carriers.

Aspect 3: The method of aspect 2, wherein the search space for the virtual component carrier is separate from a search space for the first component carrier and a search space for the second component carrier.

Aspect 4: The method of any of aspects 2 through 3, wherein the configuration information comprises a carrier indicator field value assigned to the virtual component carrier.

Aspect 5: The method of aspect 4, further comprising: determining that the received DCI is associated with scheduling the first component carrier and the second component carrier based at least in part on a presence of the carrier indicator field value assigned to the virtual component carrier in the received DCI.

Aspect 6: The method of any of aspects 2 through 5, further comprising: determining that the received DCI is associated with scheduling the first component carrier and the second component carrier based at least in part on a physical downlink control channel candidate on which the DCI is received within the search space configured for scheduling multiple component carriers.

Aspect 7: The method of any of aspects 2 through 6, further comprising: determining that the received DCI is associated with scheduling the first component carrier and the second component carrier based at least in part on the search space configured for scheduling multiple component carriers.

Aspect 8: The method of any of aspects 2 through 7, further comprising: transmitting, to the base station, a UE capability report comprising an indication of how many physical downlink control channel candidates the UE is capable of monitoring within the search space for the virtual component carrier.

Aspect 9: The method of aspect 8, wherein receiving the configuration information for the virtual component carrier comprises: receiving a search space configuration for the virtual component carrier based at least in part on the UE capability report, wherein monitoring the search space configured for scheduling multiple component carriers is based at least in part on the search space configuration for the virtual component carrier.

Aspect 10: The method of any of aspects 2 through 9, wherein receiving the configuration information for the virtual component carrier comprises: receiving radio resource control signaling comprising the configuration information for the virtual component carrier.

Aspect 11: The method of any of aspects 1 through 10, wherein monitoring the search space comprises: monitoring one or more of: a first portion of a first search space of the first component carrier or monitoring a second portion of a second search space of the second component carrier, or a combination thereof.

Aspect 12: The method of aspect 11, wherein the first portion of the first search space comprises a first subset of a first plurality of physical downlink control channel candidates in the first search space, and the second portion of the second search space comprises a second subset of a second plurality of physical downlink control channel candidates in the second search space.

Aspect 13: The method of aspect 12, further comprising: receiving radio resource control signaling identifying one or more of the first subset of the first plurality of physical downlink control channel candidates or the second subset of the second plurality of physical downlink control channel candidates as being associated with simultaneously scheduling the first component carrier and the second component carrier.

Aspect 14: The method of any of aspects 12 through 13, further comprising: identifying one or more of the first subset of the first plurality of physical downlink control channel candidates or the second subset of the second plurality of physical downlink control channel candidates based at least in part on an order of physical downlink control channel candidates within the first search space or the second search space.

Aspect 15: The method of any of aspects 12 through 14, further comprising: identifying one or more of the first subset of the first plurality of physical downlink control channel candidates or the second subset of the second plurality of physical downlink control channel candidates based at least in part on a DCI size difference between the first search space and the second search space.

Aspect 16: The method of any of aspects 1 through 15, wherein the search space configured for scheduling multiple component carriers is in a non-dynamic spectrum sharing secondary cell.

Aspect 17: An apparatus for wireless communications at UE, comprising a processor; a memory coupled with the processor, wherein the memory comprises instructions executable by the processor to cause the apparatus to perform a method of any of aspects 1 through 16.

Aspect 18: An apparatus for wireless communications at UE, comprising at least one means for performing a method of any of aspects 1 through 16.

Aspect 19: A non-transitory computer-readable medium storing code for wireless communications at UE, the code comprising instructions executable by a processor to perform a method of any of aspects 1 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at user equipment (UE), comprising:
    establishing a connection, with a base station, over at least a first component carrier and a second component carrier;
    monitoring a search space comprising a set of physical downlink control channel candidates, each physical downlink control channel candidate of the set being associated with scheduling multiple component carriers;
    receiving downlink control information (DCI) from the base station based at least in part on the monitoring of the search space, the DCI scheduling a plurality of data transmissions over the first component carrier and the second component carrier; and
    performing or receiving the plurality of data transmissions over the first component carrier and the second component carrier based at least in part on the DCI.

2. The method of claim 1, further comprising:
    receiving configuration information for a specified component carrier associated with scheduling multiple component carriers, the configuration information comprising an indication of a search space of the specified component carrier, wherein the search space of the specified component carrier comprises the search space comprising the set of physical downlink control channel candidates.

3. The method of claim 2, wherein the search space for the specified component carrier is separate from a search space for the first component carrier and a search space for the second component carrier.

4. The method of claim 2, wherein the configuration information comprises a carrier indicator field value assigned to the specified component carrier.

5. The method of claim 4, further comprising:
    determining that the received DCI is associated with scheduling the first component carrier and the second component carrier based at least in part on a presence of the carrier indicator field value assigned to the specified component carrier in the received DCI.

6. The method of claim 2, further comprising:
    determining that the received DCI is associated with scheduling the first component carrier and the second component carrier based at least in part on a physical downlink control channel candidate of the set of physical downlink control channel candidates on which the DCI is received within the search space.

7. The method of claim 2, further comprising:
    determining that the received DCI is associated with scheduling the first component carrier and the second component carrier based at least in part on the search space comprising the set of physical downlink control channel candidates.

8. The method of claim 2, further comprising:
    transmitting, to the base station, a UE capability report comprising an indication of how many physical downlink control channel candidates the UE is capable of monitoring within the search space for the specified component carrier.

9. The method of claim 8, wherein receiving the configuration information for the specified component carrier comprises:
receiving a search space configuration for the specified component carrier based at least in part on the UE capability report, wherein monitoring the search space comprising the set of physical downlink control channel candidates is based at least in part on the search space configuration for the specified component carrier.

10. The method of claim 1, wherein monitoring the search space comprises:
monitoring one or more of: a first portion of a first search space of the first component carrier or monitoring a second portion of a second search space of the second component carrier, or a combination thereof.

11. The method of claim 10, wherein the first portion of the first search space comprises a first subset of a first plurality of physical downlink control channel candidates of the set of physical downlink control channel candidates in the first search space, and the second portion of the second search space comprises a second subset of a second plurality of physical downlink control channel candidates of the set of physical downlink control channel candidates in the second search space.

12. The method of claim 11, further comprising:
receiving radio resource control signaling identifying one or more of the first subset of the first plurality of physical downlink control channel candidates or the second subset of the second plurality of physical downlink control channel candidates as being associated with simultaneously scheduling the first component carrier and the second component carrier.

13. The method of claim 11, further comprising:
identifying one or more of the first subset of the first plurality of physical downlink control channel candidates or the second subset of the second plurality of physical downlink control channel candidates based at least in part on an order of physical downlink control channel candidates within the first search space or the second search space.

14. The method of claim 11, further comprising:
identifying one or more of the first subset of the first plurality of physical downlink control channel candidates or the second subset of the second plurality of physical downlink control channel candidates based at least in part on a DCI size difference between the first search space and the second search space.

15. An apparatus for wireless communications at user equipment (UE), comprising:
a processor, and
a memory coupled with the processor, with instructions stored in the memory, the instructions being executable by the processor to cause the apparatus to:
establish a connection, with a base station, over at least a first component carrier and a second component carrier;
monitor a search space comprising a set of physical downlink control channel candidates, each physical downlink control channel candidate of the set being associated with scheduling multiple component carriers;
receive downlink control information (DCI) from the base station based at least in part on the monitoring of the search space, the DCI scheduling a plurality of data transmissions over the first component carrier and the second component carrier; and
perform or receive the plurality of data transmissions over the first component carrier and the second component carrier based at least in part on the DCI.

16. The apparatus of claim 15, wherein the instructions are further executable by the processor to cause the apparatus to:
receive configuration information for a specified component carrier associated with scheduling multiple component carriers, the configuration information comprising an indication of a search space of the specified component carrier, wherein the search space of the specified component carrier comprises the search space comprising the set of physical downlink control channel candidates.

17. The apparatus of claim 16, wherein the search space for the specified component carrier is separate from a search space for the first component carrier and a search space for the second component carrier.

18. The apparatus of claim 16, wherein the configuration information comprises a carrier indicator field value assigned to the specified component carrier.

19. The apparatus of claim 18, wherein the instructions are further executable by the processor to cause the apparatus to:
determine that the received DCI is associated with scheduling the first component carrier and the second component carrier based at least in part on a presence of the carrier indicator field value assigned to the specified component carrier in the received DCI.

20. The apparatus of claim 16, wherein the instructions are further executable by the processor to cause the apparatus to:
determine that the received DCI is associated with scheduling the first component carrier and the second component carrier based at least in part on a physical downlink control channel candidate of the set of physical downlink control channel candidates on which the DCI is received within the search space.

21. The apparatus of claim 16, wherein the instructions are further executable by the processor to cause the apparatus to:
determine that the received DCI is associated with scheduling the first component carrier and the second component carrier based at least in part on the search space comprising the set of physical downlink control channel candidates.

22. The apparatus of claim 16, wherein the instructions are further executable by the processor to cause the apparatus to:
transmit, to the base station, a UE capability report comprising an indication of how many physical downlink control channel candidates the UE is capable of monitoring within the search space for the specified component carrier.

23. The apparatus of claim 22, wherein the instructions to receive the configuration information for the specified component carrier are executable by the processor to cause the apparatus to:
receive a search space configuration for the specified component carrier based at least in part on the UE capability report, wherein monitoring the search space comprising the set of physical downlink control channel candidates is based at least in part on the search space configuration for the specified component carrier.

24. The apparatus of claim 15, wherein the instructions to monitor the search space are executable by the processor to cause the apparatus to:
 monitor one or more of: a first portion of a first search space of the first component carrier or monitoring a second portion of a second search space of the second component carrier, or a combination thereof.

25. The apparatus of claim 24, wherein the first portion of the first search space comprises a first subset of a first plurality of physical downlink control channel candidates of the set of physical downlink control channel candidates in the first search space, and the second portion of the second search space comprises a second subset of a second plurality of physical downlink control channel candidates of the set of physical downlink control channel candidates in the second search space.

26. The apparatus of claim 25, wherein the instructions are further executable by the processor to cause the apparatus to:
 receive radio resource control signaling identifying one or more of the first subset of the first plurality of physical downlink control channel candidates or the second subset of the second plurality of physical downlink control channel candidates as being associated with simultaneously scheduling the first component carrier and the second component carrier.

27. The apparatus of claim 25, wherein the instructions are further executable by the processor to cause the apparatus to:
 identify one or more of the first subset of the first plurality of physical downlink control channel candidates or the second subset of the second plurality of physical downlink control channel candidates based at least in part on an order of physical downlink control channel candidates within the first search space or the second search space.

28. The apparatus of claim 25, wherein the instructions are further executable by the processor to cause the apparatus to:
 identify one or more of the first subset of the first plurality of physical downlink control channel candidates or the second subset of the second plurality of physical downlink control channel candidates based at least in part on a DCI size difference between the first search space and the second search space.

29. An apparatus for wireless communications at user equipment (UE), comprising:
 means for establishing a connection, with a base station, over at least a first component carrier and a second component carrier;
 means for monitoring a search space comprising a set of physical downlink control channel candidates, each physical downlink control channel candidate of the set being associated with scheduling multiple component carriers;
 means for receiving downlink control information (DCI) from the base station based at least in part on the monitoring of the search space, the DCI scheduling a plurality of data transmissions over the first component carrier and the second component carrier; and
 means for performing or receiving the plurality of data transmissions over the first component carrier and the second component carrier based at least in part on the DCI.

30. A non-transitory computer-readable medium storing code for wireless communications at user equipment (UE), the code comprising instructions executable by a processor to:
 establish a connection, with a base station, over at least a first component carrier and a second component carrier;
 monitor a search space comprising a set of physical downlink control channel candidates, each physical downlink control channel candidate of the set associated with scheduling multiple component carriers;
 receive downlink control information (DCI) from the base station based at least in part on the monitoring of the search space, the DCI scheduling a plurality of data transmissions over the first component carrier and the second component carrier; and
 perform or receive the plurality of data transmissions over the first component carrier and the second component carrier based at least in part on the DCI.

\* \* \* \* \*